United States Patent [19]

Terui et al.

[11] Patent Number: 5,717,611

[45] Date of Patent: Feb. 10, 1998

[54] SLIGHT MOTION DETECTING DEVICE

[75] Inventors: Nobuhiko Terui, Ichikawa; Sueyuki Ohishi, Tokyo; Tadao Kai, Kawasaki, all of Japan

[73] Assignee: Nikon Corporation, Tokyo, Japan

[21] Appl. No.: 319,642

[22] Filed: Oct. 7, 1994

[30] Foreign Application Priority Data

Oct. 8, 1993 [JP] Japan .................. 5-277810
Feb. 3, 1994 [JP] Japan .................. 6-011668

[51] Int. Cl.$^6$ .................................. G01H 1/00
[52] U.S. Cl. .................. 364/566; 364/508; 348/208
[58] Field of Search .................. 364/566, 508, 364/571.01, 571.02, 571.04, 571.05, 571.06, 571.07, 575; 348/500, 208, 356

[56] References Cited

U.S. PATENT DOCUMENTS

| | | | |
|---|---|---|---|
| 4,967,279 | 10/1990 | Murashima | 354/400 |
| 5,175,580 | 12/1992 | Shiomi | 354/410 |
| 5,287,171 | 2/1994 | Ohtsubo et al. | 348/500 |
| 5,396,286 | 3/1995 | Ishizuka | 348/208 |
| 5,416,558 | 5/1995 | Katayama et al. | 354/446 |
| 5,430,480 | 7/1995 | Allen et al. | 348/208 |
| 5,434,642 | 7/1995 | Sasagaki | 354/471 |
| 5,497,192 | 3/1996 | Ishizuka | 348/208 |
| 5,517,238 | 5/1996 | Hirasawa | 348/208 |
| 5,537,182 | 7/1996 | Wakabayashi et al. | 396/55 |
| 5,539,496 | 7/1996 | Wakabayashi et al. | 396/287 |
| 5,568,190 | 10/1996 | Noguchi et al. | 348/208 |

FOREIGN PATENT DOCUMENTS 7-20521  1/1995  Japan .

Primary Examiner—James P. Trammell

[57] ABSTRACT

A slight motion detecting device includes a angular velocity sensor, a low pass filter, a high pass filter, an amplifier, and a CPU. The CPU differentiates an output from the angular velocity sensor so as to obtain an angular acceleration, and determines that a peak of the acceleration is obtained at the time at which the sign of the acceleration is changed, and further, calculates a zero level detection value of the angular velocity, from the peak, thereby the output of the angular velocity sensor is corrected in accordance with the zero level detection value.

35 Claims, 34 Drawing Sheets

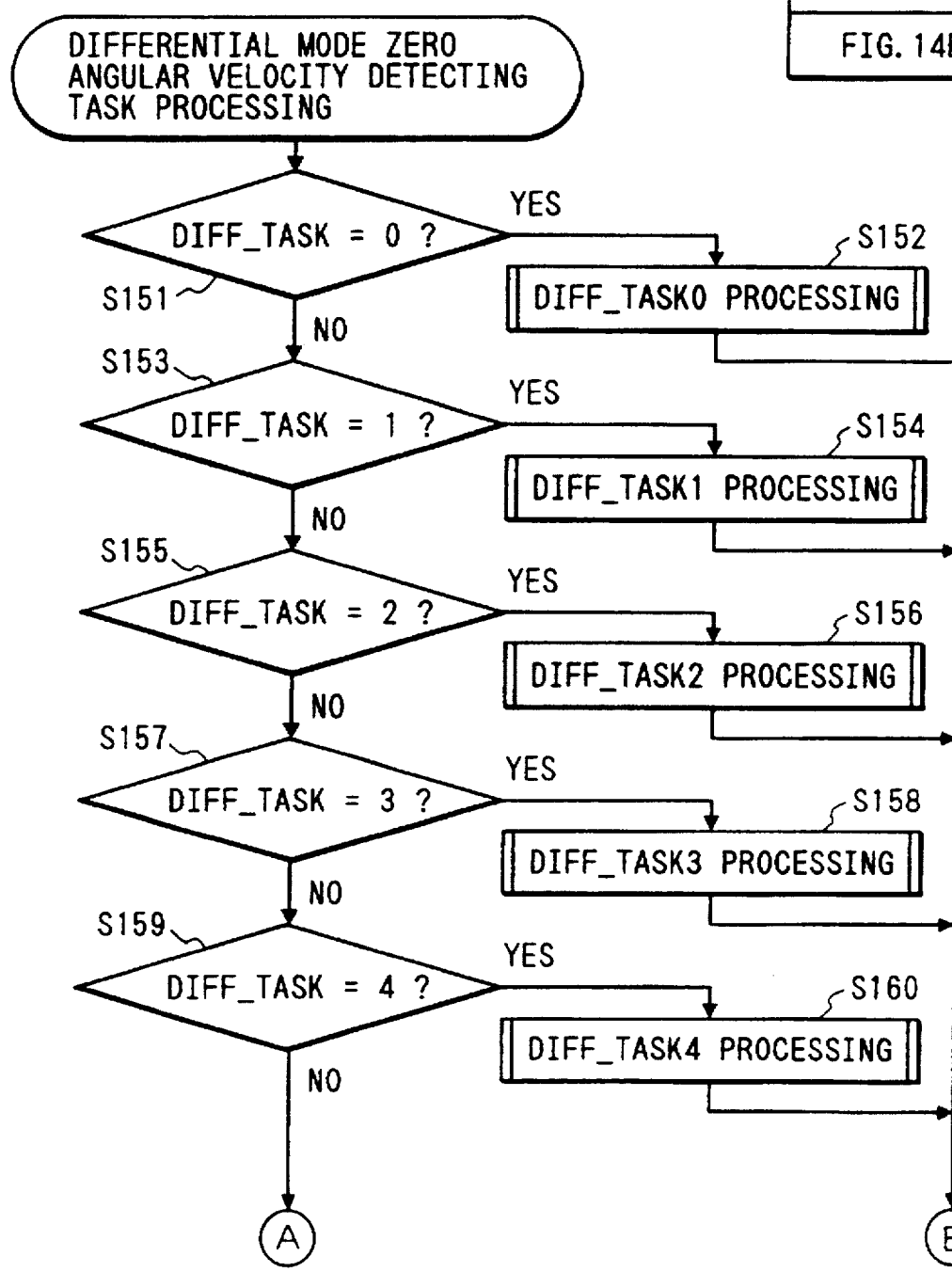

SLIGHT MOTION DETECTING DEVICE

BACKGROUND OF THE INVENTION

1. Field of the Invention

The present invention relates to a device for detecting slight motion of a still camera, a video camera or the like upon shooting.

2. Related Background Art

A slight motion detecting device incorporating a sensor such as an angular velocity sensor or the like, for detecting slight motion of a still camera or a video camera so as to move a correcting lens in a direction reverse to the direction of the detected motion so as to compensate the slight motion has heretofore been well-known.

FIG. 1 is a circuit diagram showing a basic construction of a slight motion detecting device which incorporates an angular velocity sensor 1 for detecting an angular velocity of a camera caused by a slight motion exerted to the camera, a low pass filter (which will be hereinbelow denoted as "LPF") 2 for removing high frequency components other than the slight motion, and a high pass filter (which will be hereinbelow denoted as "HPF") 3 composed of a capacitor C and a resistor R for removing low frequency components containing d.c. components, other than the slight motion. An output from the HPF is amplified by a noninverting operational amplifier 4, and is delivered to an A/D conversion input terminal 5 of a control circuit 5 constituted by a computer.

Further, a switch 6 connected to the ground at one end is connected at the other end to the connection mid-point between the capacitor C and the resistor R, and is adapted to be on-off controlled by a control signal delivered from a control terminal 5a of the control circuit 5.

With this arrangement, when a power source (which is not shown) is energized, the switch 6 is turned on (or closed) so that the connection mid-point between the capacitor C and the resistor R is grounded, and accordingly, the HPF 3 is initialized. Since the output of the noninverting operational amplifier 4 is adapted to become zero when the input thereof is zero, the output becomes 0 V (volt) when the switch 6 is turned on.

Since the angular velocity sensor 1 stabilizes its output after a certain time elapses from the time of energization of the power source so as to enable detection of an angular velocity, a control signal is delivered from the control terminal 5a of the control circuit 5 after a predetermined time elapses so as to turn off the switch 6 in order to activate the HPF 3. Accordingly, the operational amplifier 4 delivers a signal indicating an angular velocity caused by slight motion to the control circuit 5 in which the signal is converted into a digital signal from which a degree of the slight motion is computed.

FIGS. 36A to 36D are views showing waveforms at several parts, which have been given from the time when the power source (t=t0) is turned on upon slight motion of the camera. FIG. 36A shows an angular displacement ω0 due to slight motion in the angular velocity sensor 1, FIG. 36B shows an angular velocity v due to the slight motion, which is an output from the angular velocity sensor 1, FIG. 36C shows an output S from the LPF 2, and FIG. 36D shows an output from the operational amplifier 4. It is noted that the part indicated by the broken line in FIG. 36C exhibits a condition in which no slight motion occurs.

If the angular displacement ω0 is given by a sinusoidal waveform as shown in FIG. 36A, the angular velocity v has to ideally fall in a condition in which the phase is shifted by an angle of 90° as shown in FIG. 36C. However, the angular velocity sensor 1 does not deliver its output corresponding to an actual angular velocity before a stabilization time (t=t1) of the angular velocity sensor 1, as shown in FIG. 36C.

Further, if the switch 6 is turned off at a time t2 after the elapse of the stabilization time of the angular velocity sensor 1 at the moment, the output OUT of the angular velocity sensor 1 exhibits 0 V. Since the output S of the LPF 2 exhibits an angular velocity Δv caused by an exerted slight motion although it exhibits zero if no slight motion is exerted, no value of an angular velocity v can be obtained from the output OUT of the operational amplifier 4 at the moment when the switch 6 is turned off.

It is noted here that a curve of the angular velocity v=0 when a slight motion being exerted, is exhibited by the broken line in FIG. 36D, and can be given by the following expression (1):

$$\Delta v[1-\text{EXP}\{-(t-t2)/CR\}] \tag{1}$$

If the angular velocity v is zero when the output OUT of the operational amplifier 4 is 0 V, the value exhibited by the expression (1) gives an error. Accordingly, an advantage occurs such that the larger the angular velocity Δv caused by a slight motion when the switch 6 being turned off, the longer the time T by which the operational amplifier 4 can precisely deliver the angular velocity.

In order to solve the above-mentioned problem, the present assignee has proposed a device, as shown in Japanese Patent Application No. 5-190876, in which the control circuit 5 monitors the output of the angular velocity sensor 1 before it passes through the HPF 3, so as to set the timing with which the switch 6 is turned off, to a time at which the angular velocity is lowest, or ideally zero, and accordingly, an accurate angular velocity can be obtained just after the moment at which the switch 6 is turned off, thereby it is possible to shorten the period by which the angular velocity can be precisely calculated.

FIG. 37 is a circuit diagram which shows the slight motion detecting device having been proposed by the applicant (Japanese Patent Application No. 5-190876), and FIGS. 38A to 38E are views which show waveforms at several parts in FIG. 37.

The circuit shown in FIG. 37, is substantially similar to the above-mentioned arrangement shown in FIG. 1, except that a second A/D conversion input terminal 5c is added to the control circuit 5 so that the output S from the LPF 2 is delivered to this terminal 5c.

Among FIGS. 38A to 38E which show the waveforms which have been generated at several positions from the time of the energization of the power source (t=t0) when a slight motion is exerted to a camera, FIGS. 38A to 38C show the waveforms that are the same as those shown in FIGS. 36A to 36C, that is, FIG. 38A shows an angular displacement ω caused by slight motion, FIG. 38B shows an angular velocity v which is caused by the slight motion and which is an output from the angular velocity sensor 1, and FIG. 38C shows an output S from the LPF 2. Further, FIG. 38D shows an angular acceleration a which is obtained by differentiating the output S of the LPF 2, and FIG. 38E shows an output OUT from the operational amplifier 4.

That is, when the switch 6 is turned on, since no angular velocity can be obtained from the output OUT of the operational amplifier 4, the output S of the LPF 2 is monitored so as to detect an angular velocity while the control circuit 5 calculates an acceleration α so as to determine the acceleration has a peak value, and then, turns off the switch 6 in order to detect the angular velocity from the A/D conversion input terminal 5a.

However, the slight motion detecting device as shown in FIG. 37 in which the angular velocity is differentiated so as to obtain an angular acceleration, and then is determined so as to have a peak value in order to confirm that the angular velocity is zero, has offered such a problem that the thus obtained peak has a large error if the angular velocity signal contains noise.

FIG. 39 shows another conventional example of the slight motion detecting device which comprises an angular velocity sensor 11 for detecting an angular velocity caused by a slight motion, a low pass filter 12 for removing high frequency component noise contained in an output from the angular velocity sensor 10, and a high pass filter and operational amplifier 13 for removing low frequency component noise contained in an output of the low pass filter 12 and for amplifying the output of the low pass filter 12. A capacitor C and a resistance R1 contained in the high pass filter and operational amplifier 13 constitute the high pass filter, and further, an operation amplifier OP constitutes the operational amplifier.

An analog switch SW1 is connected one of input terminals of the operational amplifier OP, and accordingly, when this analog switch SW1 is turned on (closed), the operational amplifier OP delivers a voltage of about 0 volt while when it is turned off (open), the operational amplifier OP delivers a voltage amplified by an amplification factor based upon the voltage dividing ratio of resistors R2, R3.

A CPU 14 converts an output from the high pass filter and operational amplifier 13 so as to compute a degree of slight motion. This CPU 14 is connected thereto with a switch SW2 which is turned on (closed) in association the operation of a release button which is not shown, and accordingly, when the switch SW2 is turned on, the CPU 14 energizes the angular velocity sensor 11. Further, a display circuit 15 is adapted for displaying a slight motion under in response to an instruction from the CPU 14.

FIGS. 40A to 40D are views which show waveforms at several positions. The operation of this conventional slight motion detecting device shown in FIG. 39 will be hereinbelow explained with reference to FIG. 39 and FIGS. 40A to 40D.

When the switch SW2 is turned on, the CPU 14 recognizes that a release button on a camera is halfly depressed, and the angular velocity sensor 11 is energized so as to initiate the detection of an angular velocity (at time t1 shown in FIG. 40D).

At this time, as shown in FIG. 40C, it is estimated that an angular velocity caused by slight motion and exhibited by a sinusoidal wave signal ω having a predetermined period is given to the angular velocity sensor 11. In this condition, since the analog switch SW1 is turned on, voltages at both input terminals of the operational amplifier OP become about zero volt together, and accordingly, the output of the operational amplifier OP becomes about zero volts. Accordingly, the voltage after A/D conversion (which will be hereinbelow denoted as "A/D conversion output V") also becomes about zero volts.

It is noted that the waveform of the A/D conversion output V varies around zero volt as a center (time t1 to t2 in FIG. 40D) because the output of the angular velocity sensor 11 is not yet stabilized just after the energization thereof. Further, if the analog switch SW1 is turned on just after the energization of the angular velocity sensor 11, the output of the angular velocity sensor 14 is not stabilized just after the energization thereof and accordingly, there would be a risk such that the angular velocity sensor 14 delivers an output which is different from an actually generated angular velocity.

When the angular velocity sensor 11 is stabilized, the CPU 14 turns on the analog switch SW1 (time t2). Accordingly, after high frequency component noise is removed by the low pass filter 12, d.c. components are removed by the capacitor C in the high pass filter and amplifier 13. The reason why the d.c. component is removed at this time is to prevent occurrence of such a risk that if the signal containing d.c. components should be amplified by the operational amplifier OP, the output of the operational amplifier OP becomes excessively high, exceeding the energization voltage of the operational amplifier OP itself. Thus, the amplification factor of the operational amplifier OP can be increased by removing d.c. components, and accordingly, even though a variation in the output of the angular velocity sensor 11 is slight, the variation in the output can be precisely detected.

The output of the operational amplifier 11 is delivered to the CPU 14, and accordingly, the degree of a slight motion exerted to the camera is detected. During the period in which the release button is halfly depressed, the above-mentioned detection of the slight motion is continuously carried out, and accordingly, the display by the display circuit 15 is changed in accordance with a degree of detected slight motion. Meanwhile, when the release button is fully depressed, the CPU 14 moves a correcting lens which is not shown.

In the slight motion detecting device shown in FIG. 39, the detection sensitivity of the operational amplifier 11 is enhanced by removing d.c. components with the use of the capacitor. However, there is a problem such that it cannot specify a voltage level (which will be hereinbelow denoted as "reference level") corresponding to an angular velocity of zero, among outputs from the operational amplifier OP. Thus, heretofore, the output of the operational amplifier OP has been continuously detected for a predetermined period so as to calculate an averaged value of detected values, from which the reference value is obtained. However, the precise calculation for the reference level requires a long time measurement for the output of the operational amplifier, and accordingly, a relatively long time is required for calculating the reference level.

As mentioned above, the output of the angular velocity sensor 11 is unstable until a predetermined time elapses after the angular velocity sensor 11 is energized, and accordingly, the analog switch SW1 is turned on for a while after the energization so as to set the output of the angular velocity sensor 11 to about zero volts. In this condition, if the analog switch SW1 is turned off, a voltage value with which the output value of the angular velocity sensor 11 is about zero volts at that time, is delivered from the operational amplifier OP. That is, as shown in FIG. 40D, a voltage which is obtained by adding an offset value Δω1 to an angular velocity ω0 caused by slight motion is delivered from the operational amplifier OP.

This offset value is exponentially decreased by a time which is determined by the time constant of the capacitor C and the resistance R1 (refer to a waveform exhibited by the dotted line in FIG. 40D). The offset value depends upon the angular velocity ω0 at the time of the turn-off of the analog switch SW1 at the time t2, and accordingly, no precise value can be obtained in a short time after the energization even though a voltage level corresponding to an angular velocity of zero is to be measured.

Accordingly, it has to wait until the above-mentioned value becomes sufficiently small in order to obtain a precise angular velocity ω0 caused by a slight motion. However, the combination of the capacitor C and the resistor R1 sometimes requires a long time until the offset value becomes sufficiently small.

Further, since conventional devices do not have effective means for determining whether or not the offset value becomes small so that it does not affect the detection of angular velocity, slight motion is detected sometimes in a such a condition that the offset value is large, and the result of the detection is displayed by the display circuit 15. In this case, the cameraman would possibly misunderstand the situation.

SUMMARY OF THE INVENTION

The present invention is devised in view of the above-mentioned disadvantages inherent to the conventional slight motion detecting device so as to precisely detect a signal level when the angular velocity caused by slight motion is zero, and accordingly one object of the present invention is to provide a slight motion detecting device which can precisely and rapidly detect slight motion.

Another object of the present invention is to provide a slight motion detecting device which can carry out a reliable display with which a slight motion can be confirmed at a glance.

In order to achieve the above-mentioned objects, according to the first aspect of the present invention, there is provided a slight motion detecting device comprising: slight motion detecting means for detecting a slight motion; extreme value detecting means for detecting extreme values of outputs from the slight motion detecting means; prezero level detecting means for detecting a prezero level corresponding to an output from the slight motion detecting means in the case of no slight motion, in accordance with an output from the extreme value detecting means; and slight motion output correcting means for correcting an output from the slight motion detecting means in accordance with a signal from the prezero level detecting means.

According to the second aspect of the present invention, there is provided a slight motion detecting device comprising: slight motion detecting means for detecting slight motion; amplifying means for amplifying a signal from the slight motion detecting means; extreme value detecting means for detecting extreme values of outputs from the amplifying means; prezero level detecting means for detecting a prezero level corresponding to an output from the amplifying means in the case of no slight motion, in accordance with an output from the extreme value detecting means; and slight motion output correcting means for correcting an output from the amplifying means in accordance with a signal from the prezero level detecting means.

According to the third aspect of the present invention, there is provided a slight motion detecting device comprising: slight motion detecting means for detecting slight motion; extreme value detecting means for detecting extreme values of outputs from the slight motion detecting means; prezero level detecting means for detecting a prezero level corresponding to an output from the slight motion detecting means in the case of no slight motion, in accordance with an output from the extreme value detecting means; moving average calculating means for a moving average of outputs from the prezero level detecting means; and slight motion output correcting means for correcting an output from the slight motion detecting means in accordance with a signal from the moving average calculating means.

According to the fourth aspect of the present invention, there is provided a slight motion detecting device comprising: slight motion output means for outputting a detection signal corresponding to slight motion; differentiating means for differentiating the detection signal and for outputting a differentiated signal; sign change detecting means for detecting a change of the sign of the differentiated signal; reference level calculating means for calculating a reference level for the detection signal in accordance with the detection signal until the sign of the differentiated signal is changed from one to the other with the change of the sign being detected by the sign change detecting means; and slight motion amount correcting means for correcting the slight motion in accordance with the reference level.

It is preferable that the sign change detecting means includes stopping means for stopping detection of the sign change for a predetermined time from the time when the sign change is detected.

Preferably, the slight motion detecting device further comprises display means for changing a display configuration in accordance with slight motion detected by the slight motion correcting means; and reference level number measuring means for measuring a number of the reference levels repeatedly calculated by the reference level calculating means, wherein the display means stops its display operation when a number calculated by the reference level number measuring means is less than a predetermined number.

Further, the slight motion detecting device comprises display means for changing the display configuration in accordance with slight motion detected by the slight motion correcting means; and a reference level number measuring means for measuring a number of the reference levels repeatedly calculated by the reference level calculating means, wherein the display means displays a configuration different from a display configuration in accordance with the degree of slight motion if a number calculated by the reference level number measuring means is less than a predetermined number.

The slight motion output means outputs an angular velocity signal in accordance with the slight motion.

According to the fifth aspect of the present invention, there is provided a slight motion detecting device comprising: slight motion output means for outputting a detection signal corresponding to slight motion; differentiating means for differentiating the detection signal and for outputting a differentiated signal; averaging means for averaging the differentiated signal and for outputting an averaged signal; sign change detecting means for detecting a change of the sign of the averaged signal; reference level calculating means for calculating a reference level for the detection signal in accordance with the detection signal until the sign of the differentiated signal is changed from one to the other with the change of the sign being detected by the sign change detecting means; and slight motion correcting means for correcting the slight motion in accordance with the reference level.

According to the sixth aspect of the present invention, there is provided a slight motion detecting device comprising: slight motion output means for outputting a detection signal corresponding to slight motion; averaging means for averaging the detection signal and for outputting an averaged signal; differentiating means for differentiating the averaged signal and for outputting a differentiated signal; sign change detecting means for detecting a change of the sign of the differentiated signal; reference level calculating means for calculating a reference level for the detection signal in accordance with the detection signal until the sign of the differentiated signal is changed from one to the other with the change of the sign being detected by the sign change detecting means; and slight motion amount correcting means for correcting the slight motion in accordance with the reference level.

According to the seventh aspect of the present invention, there is provided a slight motion detecting device comprising: slight motion output means for outputting a detection signal corresponding to slight motion; differentiating means for differentiating the detection signal and for outputting a differentiated signal; sign change detecting means for detecting a change of the sign of the differentiated signal; reference level calculating means for calculating a reference level for the detection signal in accordance with the detection signal until the sign of the differentiated signal is changed from one to the other with the change of the sign being detected by the sign change detecting means; and reference level detecting precision improving means for averaging the repeatedly calculated reference levels which are calculated by the reference level calculating means; and slight motion correcting means for correcting the slight motion in accordance with an output from the reference level detecting precision improving means.

The reference level detecting precision improving means preferably averages a predetermined number of those of the repeatedly calculated reference levels, which have been lastly calculated, or all of the repeatedly calculated reference levels if all the repeatedly calculated reference level have a number less than the predetermined number.

Preferably, the slight motion detecting device comprises reference level extracting means for extracting those of the repeatedly calculated reference levels which fall in a first reference range, wherein reference level detecting precision improving means averages the reference levels extracted by the reference level extracting means.

Further, the slight motion detecting device preferably comprises measuring means for measuring a number of reference levels extracted by the reference level extracting means, wherein the reference level extracting means extracts the reference levels which fall in a second reference range which is broader than the first reference range if the measured number is less than a predetermined number.

Further, the slight motion detecting device preferably comprises measuring means for measuring a number of the reference level extracted by the reference level extracting means, wherein the reference level extracting means extracts the reference levels which falls in a second reference range narrower than the first reference range if the measured number is greater than a predetermined number.

According to the eighth aspect of the present invention, there is provided a slight motion detecting device comprising: slight motion output means for outputting a detection signal corresponding to slight motion; amplifying means for amplifying the detection signal; differentiating means for differentiating an output from the amplifying means and for outputting a differentiated signal; sign change detecting means for detecting a change of the sign of the differentiated signal; reference level calculating means for calculating a reference level for the amplified detection signal in accordance with the detection signal until the sign of the differentiated signal is changed from one to the other with the change of the sign being detected by the sign change detecting means; and slight motion correcting means for correcting the amplified detection signal in accordance with the reference level.

Preferably, the amplifying means further comprises change-over means for changing whether a detection signal delivered from the slight motion output means is inputted or a predetermined level signal is inputted; and offset control means for carrying out such a control that the change-over means is changed over so as to input the predetermined level signal to the amplifying means for a predetermined time when the signal level of the detection signal amplified by the amplifying means, becomes substantially equal to the reference level calculated by the reference level calculated means.

Further, the slight motion detecting device comprises time measuring means for measuring a time by which the signal level of the detection signal amplified by the amplifying means becomes substantially equal to the reference level, wherein when the time measured by the time measuring means exceeds a predetermined time, the control by the offset control means is stopped.

The slight motion detecting device further comprises forced offset control means for changing over the change-over means so as to input a predetermined level signal to the amplifying means by a predetermined time when the control by the offset control means is stopped.

According to the ninth aspect of the present invention, there is provided a slight motion detecting device comprising: a slight motion output means for outputting a detection signal in accordance with slight motion; an averaging means for averaging the detection signal for every predetermined time; a reference level calculating means for calculating a reference level of the detection signal corresponding to the case of no slight motion in accordance with the averaged detection signal; and a slight motion correcting means for correcting the slight motion in accordance with the detecting signal and the reference level.

According to the tenth aspect of the present invention, there is provided a slight motion detecting device comprising: slight motion output means for outputting a detection signal in accordance with slight motion; averaging means for averaging the detection signal for every predetermined time; reference level calculating means for repeatedly calculating reference levels of the detection signal corresponding to the case of no slight motion in accordance with the averaged detection signal; reference level detecting precision improving means for averaging the repeatedly calculated reference levels which are calculated by the reference level calculating means; and slight motion correcting means for correcting the slight motion in accordance with an output from the reference level detecting precision improving means.

The reference level detecting precision improving means preferably averages a predetermined number of those of the repeatedly calculated reference levels, which are lastly calculated, or averages all the repeatedly calculated reference levels if a number of already calculated reference levels is less than the predetermined number.

Preferably, the slight motion detecting device further comprises reference level extracting means for extracting those of the repeatedly calculated reference levels which fall in the first reference range, wherein the reference level detecting means averages the reference levels extracted by the reference level extracting means.

Further, the slight motion detecting device preferably comprises measuring means for a number of the reference levels extracted by the reference level extracting means, wherein the reference level extracting means extracts the reference levels in a second reference range which is broader than the first reference range if the measured number is less than a predetermined number.

The slight motion detecting device further comprises measuring means for measuring a number of the reference levels extracted by the reference level extracting means, wherein the reference level extracting means extracts the reference levels which fall in a second reference range narrower than the first reference range if the measured number is greater than a predetermined number.

According to the eleventh aspect of the present invention, there is provided a slight motion detecting device comprising: slight motion output means for outputting a detection signal in accordance with slight motion; amplifying means for amplifying the detection signal; averaging means for averaging an output from the amplifying means for every predetermined time; reference level calculating means for repeatedly calculating reference levels of the amplified detection signal corresponding to the case of no slight motion in accordance with an output from the averaging means; reference level detecting precision improving means for averaging the repeatedly calculated reference levels which are calculated by the reference level calculating means; and slight motion correcting means for correcting the amplified detection signal in accordance with an output from the reference level detecting precision improving means.

Preferably, the slight motion detecting device further comprises change-over means for changing over whether the detection signal delivered from the slight motion detecting means is inputted to the amplifying means or a predetermined level signal is inputted thereto; and offset control means for controlling change-over of the change-over means so as to input the predetermined level signal to the amplifying means for a predetermined time when the signal level of the detection signal amplified by the amplifying means becomes substantially equal to the reference level calculated by the reference level calculating means.

Further, the slight motion detecting device comprises time measuring means for measuring a time by which the signal level of the detection signal amplified by the amplifying means becomes substantially equal to the reference level, wherein when the time measured by the time measuring means exceeds a predetermined time, the control by the offset control means is stopped.

The slight motion detecting device further comprises forced offset control means for changing over the change-over means so as to input the predetermined level signal to the amplifying means by a predetermined time when the control by the offset control means is stopped.

Further, the slight motion detecting device comprises display means for changing a display configuration in accordance with a slight motion detected by the slight motion correcting means; and reference level number measuring means for measuring a number of the reference levels repeatedly calculated by the reference level calculating means, wherein the display means stops its display operation when a number calculated by the reference level number measuring means is less than a predetermined number.

Preferably, the slight motion detecting device further comprises display means for changing the display configuration in accordance with a slight motion detected by the slight motion correcting means; and reference level number measuring means for measuring a number of the reference levels repeatedly calculated by the reference level calculating means, wherein the display means displays a configuration different from a display configuration in accordance with the slight motion if a number calculated by the reference level number measuring means is less than a predetermined number.

The slight motion output means outputs an angular velocity signal in accordance with the slight motion.

According to the twelfth aspect of present invention, there is provided a slight motion detecting device comprising: slight motion output means for delivering a detection signal in accordance with slight motion; amplifying means for amplifying the detection signal; change-over means for changing over whether the detection signal is inputted to the amplifying means or a zero level signal is inputted thereto; offset control means for controlling change-over of the change-over means so that an output from the amplifying means when a reference level signal from the slight motion output means, corresponding to the case of no slight motion, is inputted to the amplifying means, becomes substantially equal to an output which is obtained from the amplifying means when a zero level signal is inputted to the amplifying means.

The slight motion output means outputs an angular velocity signal in accordance with the slight motion.

According to the thirteenth aspect of the present invention, there is provided a slight motion detecting device comprising: slight motion output means for outputting a detection signal in accordance with slight motion; display means for changing a display configuration in accordance with a signal level of the detection signal; and a maximum or minimum level detecting means for detecting a maximum or minimum value of signal levels of the detection signal for every predetermined time, wherein the display means changes the display configuration in accordance with the detected maximum or minimum value of signal levels for every predetermined time.

The slight motion output means outputs an angular velocity signal in accordance with the slight motion.

The above and other objects, features and advantages of the present invention are explained hereinafter and may be better understood by reference to the drawings and the descriptive matter which follows.

DETAILED DESCRIPTION OF THE PREFERRED EMBODIMENTS

At first, explanation will be made of a first embodiment of a slight motion detecting device according to the present invention.

The basic circuit shown in FIG. 1 can be directly applied to the slight motion detecting device of this first embodiment, and accordingly, the explanation will be made hereinbelow with reference to FIG. 1.

Figure 2:
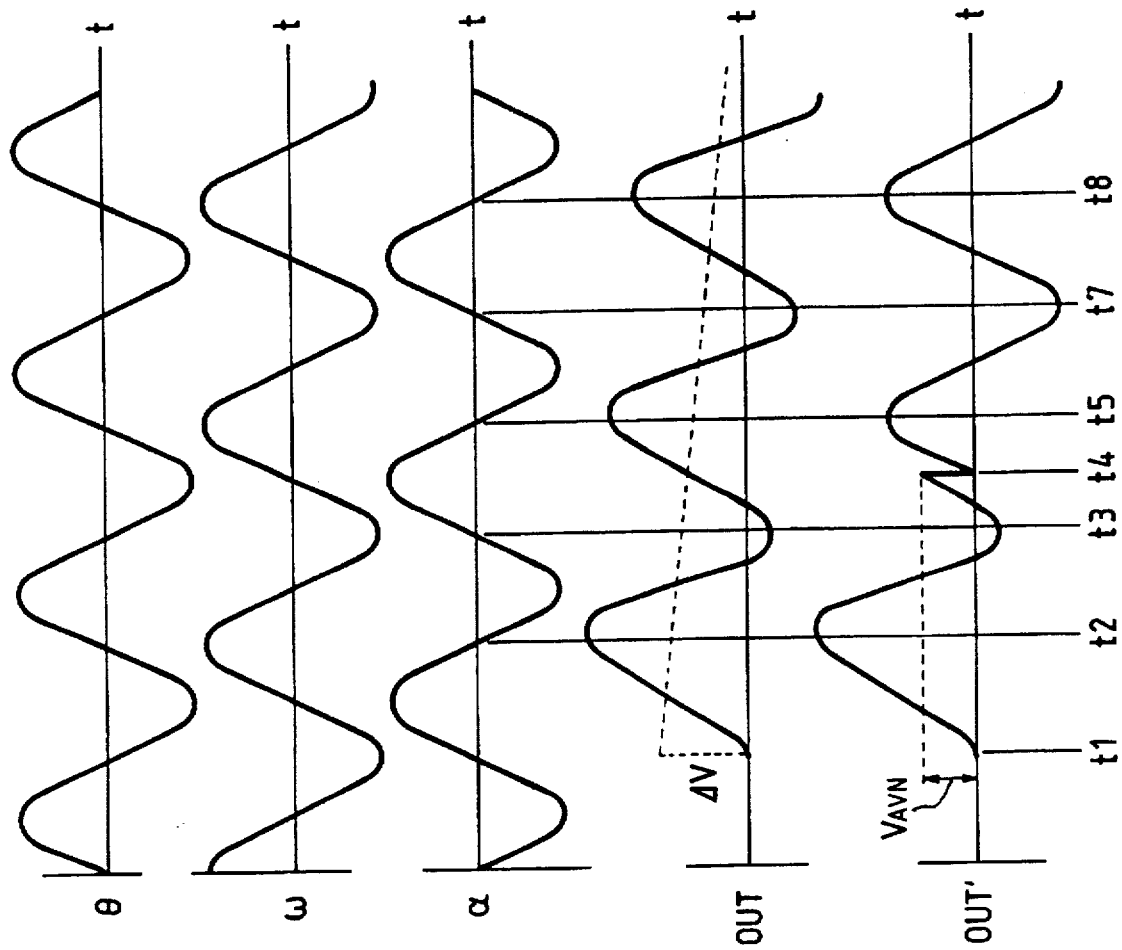
FIGS. 2A to 2E are views illustrating waveforms indicating the timings at several positions of the circuit shown in FIG. 1.

FIGS. 2A to 2E are charts which show waveforms at several positions during a period from the time when the power source is turned on (t=0) among which FIG. 2A shows an angular displacement θ caused by a slight motion, FIG. 2B shows an angular velocity ω0 caused by the slight motion, FIG. 2C shows angular acceleration α caused by the slight motion, and FIGS. 2D and 2E show outputs OUT, OUT' of an operational amplifier OP, respectively.

Figure 3:
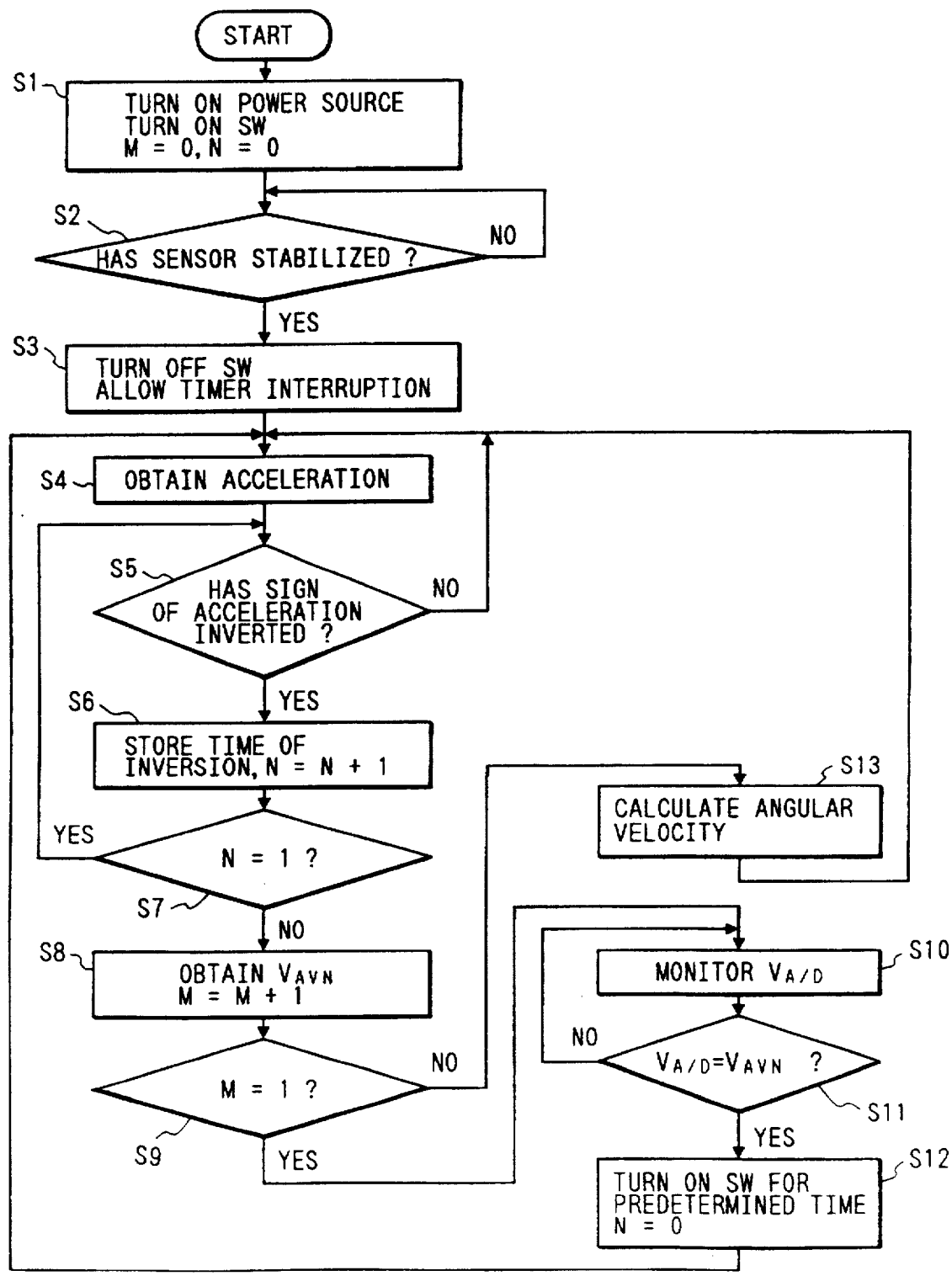
FIG. 3 is a flow-chart showing a main process of a CPU in the first embodiment.

FIG. 3 is a flow-chart for explaining the operation of the first embodiment of the slight motion detecting device according to the present invention.

When the power source is turned on, a switch 6 is turned on, and as well values M, N on a memory in a control circuit 5 are reset to zero (step S1). Then, whether the output of the angular velocity sensor 1 is stabilized or not is determined (step S2), and if it is stabilized, the switch 6 is turned off, and timer interruption which is performed at every predetermined time, is permitted (step S3, t1 in FIG. 2). At this time, the output of the operational amplifier 4 has an error ΔV exhibited by the formula (1), with respect to a true angular velocity.

Figure 4:
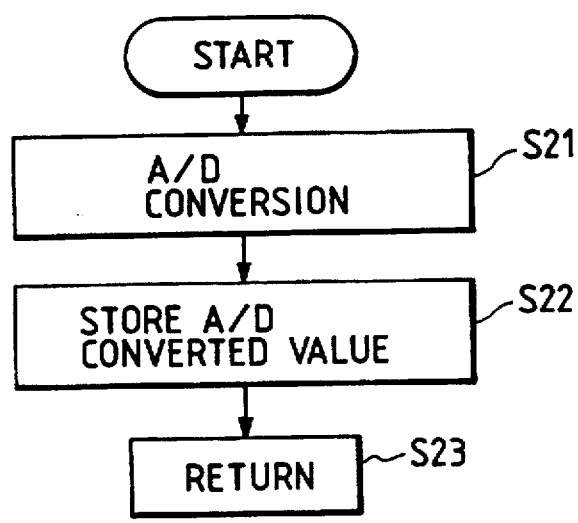
FIG. 4 is a flow-chart showing a timer interrupting handling by the CPU in the first embodiment.

As shown in the flow-chart of 3 FIG. 4, the operation of the timer interruption carries out A/D conversion (step S21), and stores the A/D converted value $V_{A/D}$ in the memory (step S22) before it returns (step S23).

Then, an angular acceleration α is obtained from the A/D converted value $V_{A/D}$ obtained by the timer interruption (step S4). Further, in order to obtain a peak of the angular velocity ω, whether the sign of the angular acceleration α is changed or not is determined (step S5), and if it is not changed, the angular acceleration a is again obtained (step S4), but if it is changed, the time t2 (refer to FIG. 2C) when the angular acceleration α is obtained, is stored, and 1 is added to the value N (step S6).

Whether the value N is 1 or not is determined (step S7), and if the value N is 1, the next change of the sign of the angular acceleration α (with the timing at t3) is detected, but if the value N is not 1, an averaged value $V_{AVN}$ of the A/D converted values $V_{A/D}$ during the period from the time when the sign was previously changed, to the time when the sign is changed at present, is obtained. Then, this value is regarded as an angular velocity ω=0, and then 1 is added to the value M (step S8).

Whether the value M is 1 or not is determined (step S9), and if the value M is 1, the A/D converted value $V_{A/D}$ is monitored (step S10) so as to wait until $V_{A/D}=V_{AVN}$ is obtained. When $V_{A/D}=V_{AVN}$ is obtained, the switch 6 is turned on (t4 in FIG. 2E) so as to set the output OUT of the operational amplifier 4 to 0 V, and accordingly, the value ΔV obtained after the switch is initially turned off, is decreased. Thus, the output OUT of the operational amplifier 4 becomes 0 V when the angular velocity ω is ω=0. Next, the value of N is set to 0, before returning to step S4.

As mentioned above, the averaged value $V_{AVN}$ of the A/D converted values $V_{A/D}$ is obtained, corresponding to the angular velocity ω=0, by detecting such a condition that the sign of the angular acceleration α is changed (t5, t7), and then 1 is added to the value M (step S8). Next, if the value M is not 1, the calculation for obtaining the angular acceleration α is carried out (step S13) before advancing to step S4.

At step S13, the calculation for obtaining the angular velocity ω can be made by use of the following formula (2):

$$\omega = V_{A/D} - V_{AVN} \qquad (2)$$

Further, $V_{AVN}$ is obtained each time when the sign of the angular acceleration a is changed. However, if the past moving average of $V_{AVN}$ is empirically obtained from the latest $V_{A/D}$, the error to the value of the true ω=0 can be decreased. Accordingly, the calculation can be obtained by the following formula (3):

$$\omega = V_{A/D} - (\Sigma V_{AVi})/K \qquad (3)$$

where Σ is a sum from i=N−K+1 to N.

It is noted that K has a predetermined value, and it has been empirically confirmed that the value is normally and preferably set to about 8. If the frequency with which the $V_{AVN}$ is obtained, is less than K, it may be sufficient to obtain the averaged value of $V_{AVN}$ obtained by the frequency.

Figure 5:
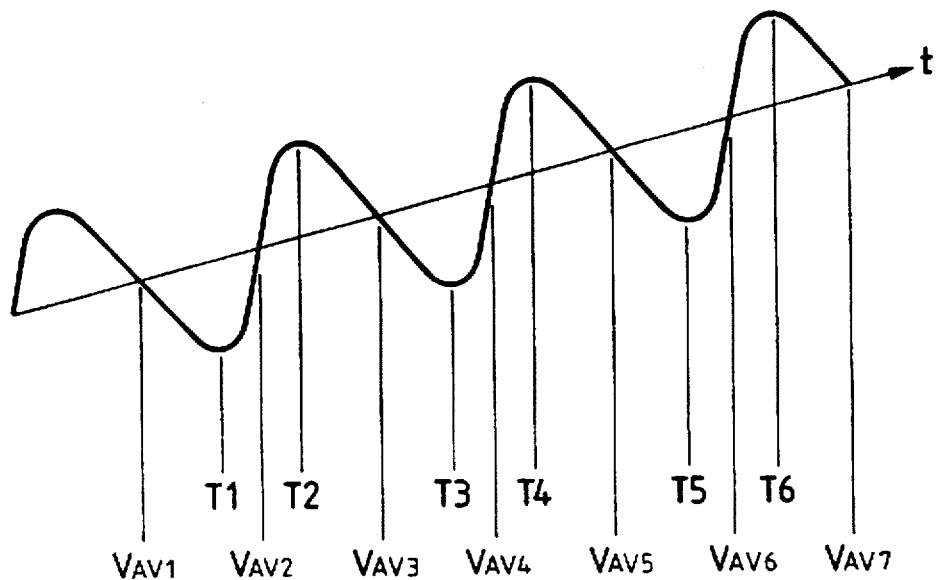
FIG. 5 is a view illustrating waveforms which exhibits sensor outputs during shooting a running object or panning.

FIG. 5 is a chart which shows the output of the angular velocity sensor during panning. The waveform is inclined ascending rightward due to the angular velocity caused by the panning, and the waving is caused by the slight motion. Should this waveform be directly regarded as the variation caused by the slight motion, as it is, the variation in the angular velocity caused by the panning would be also corrected when the slight motion is corrected, and accordingly, the background is not blurred but the object is blurred.

As mentioned above, the sign of the angular acceleration α is changed at the times T1, T2 . . . , and $V_{AV1}$, $V_{AV2}$, . . . are obtained with these timings. At this time, if the formula (2) is applied, a value which is smaller than the actual angular velocity ω by $V_{AVN}$ is recognized as an angular velocity. That is, a variation in the angular velocity, caused by the panning, is canceled out. Accordingly, the background is not corrected, but a blur caused by the slight motion alone is corrected.

Explanation will be hereinbelow made of a second embodiment of the slight motion detecting device according to the present invention.

Figure 6:
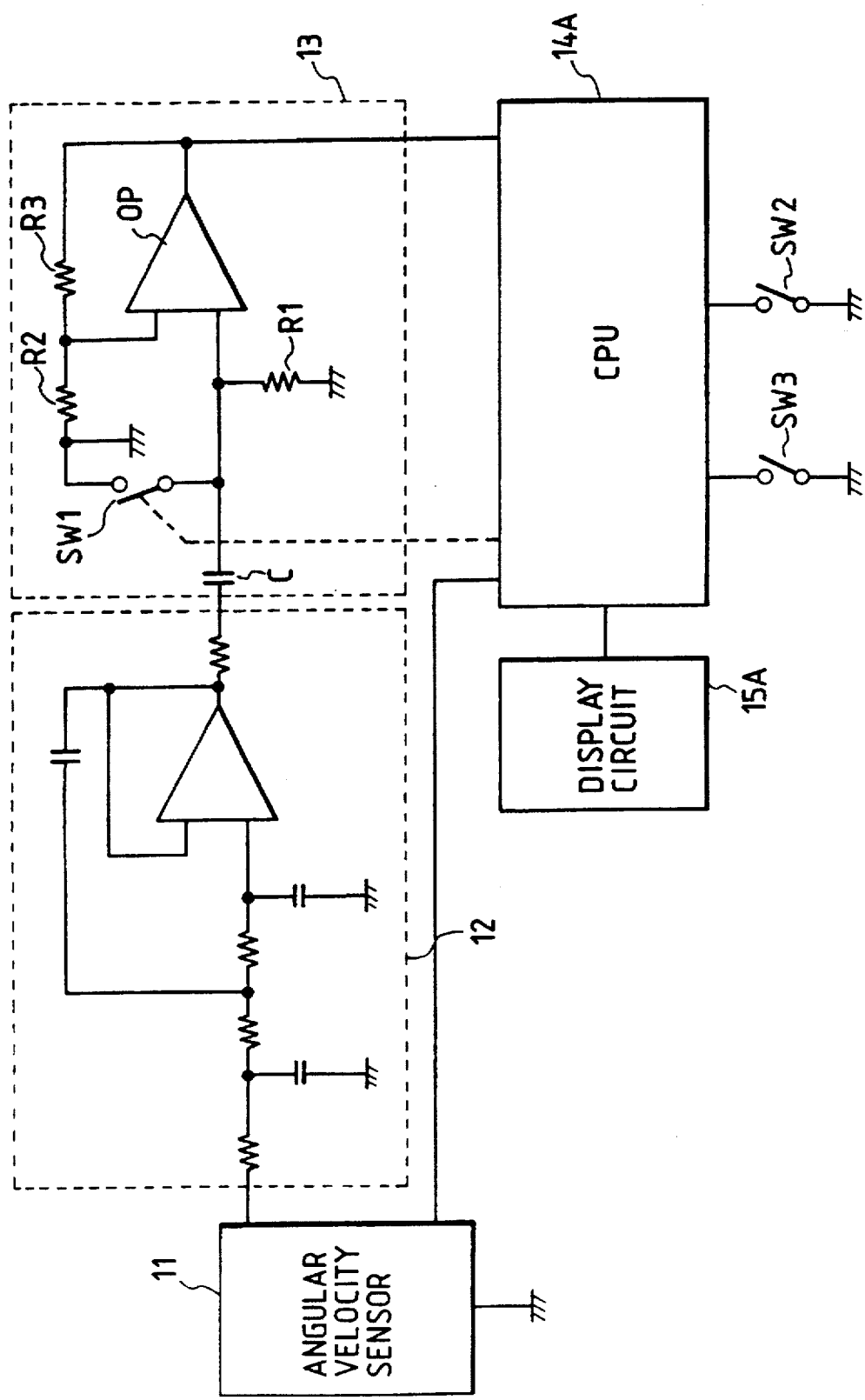
FIG. 6 is a circuit block diagram showing a second embodiment of the slight motion detecting device according to the present invention.
Figure 39:
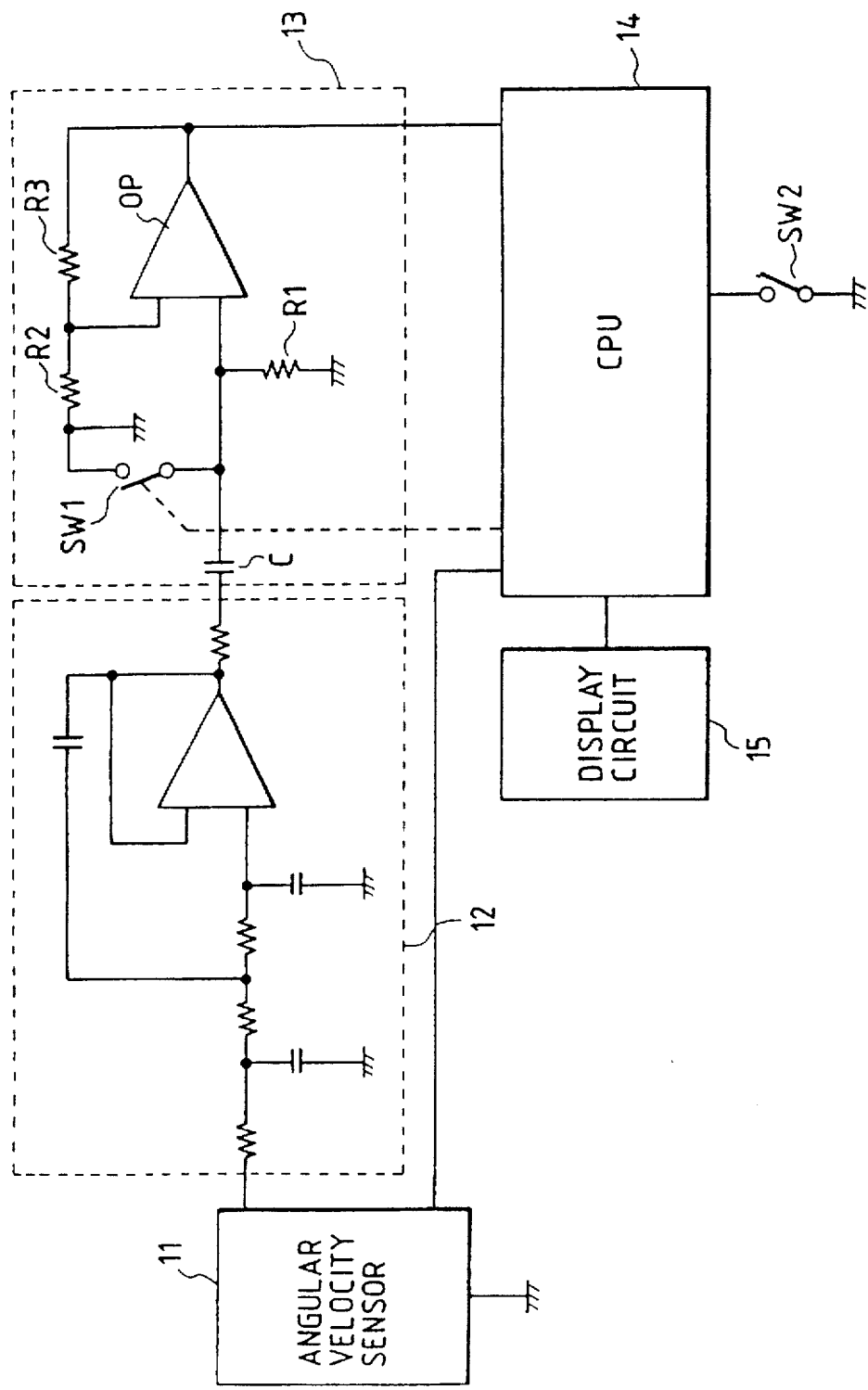
FIG. 39 is a circuit block diagram illustrating another conventional slight motion detecting device.
Figures 40A, 40B, 40C, 40D:
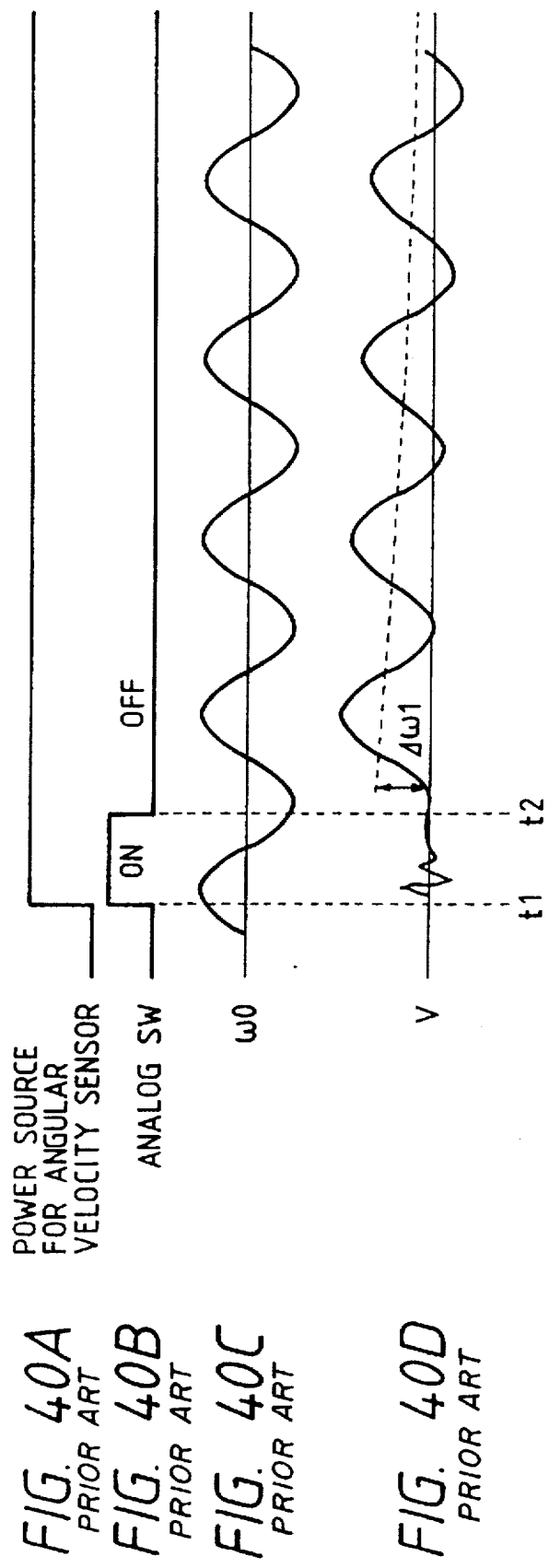
FIGS. 40A to 40D are views illustrating waveforms at several positions in the circuit shown in FIG. 39.

FIG. 6 is a circuit block diagram which shows the second embodiment of the slight motion detecting device according to the present invention, identical reference numerals are attached to component parts common to those of the conventional slight motion detecting device shown in FIG. 39. The explanation will be concentrically made for those which are different from the conventional one.

Referring to FIG. 6, a CPU 14A detects slight motion in accordance with an output from the angular velocity sensor 11. The CPU 14A is composed of a one-chip microcomputer integrally incorporated with a timer, an A/D converter, a counter and the like. A display circuit 15A performs a display corresponding to the slight motion under the instructions by the CPU 14A. The display circuit is composed of, for example, light emitting diodes (LEDs), and accordingly, the flashing speed of the LEDs is changed in accordance with the slight motion. A switch SW3 is for changing a zero angular velocity detection process which will be hereinbelow explained, between a differentiating mode and a small interval mode.

Figure 7:
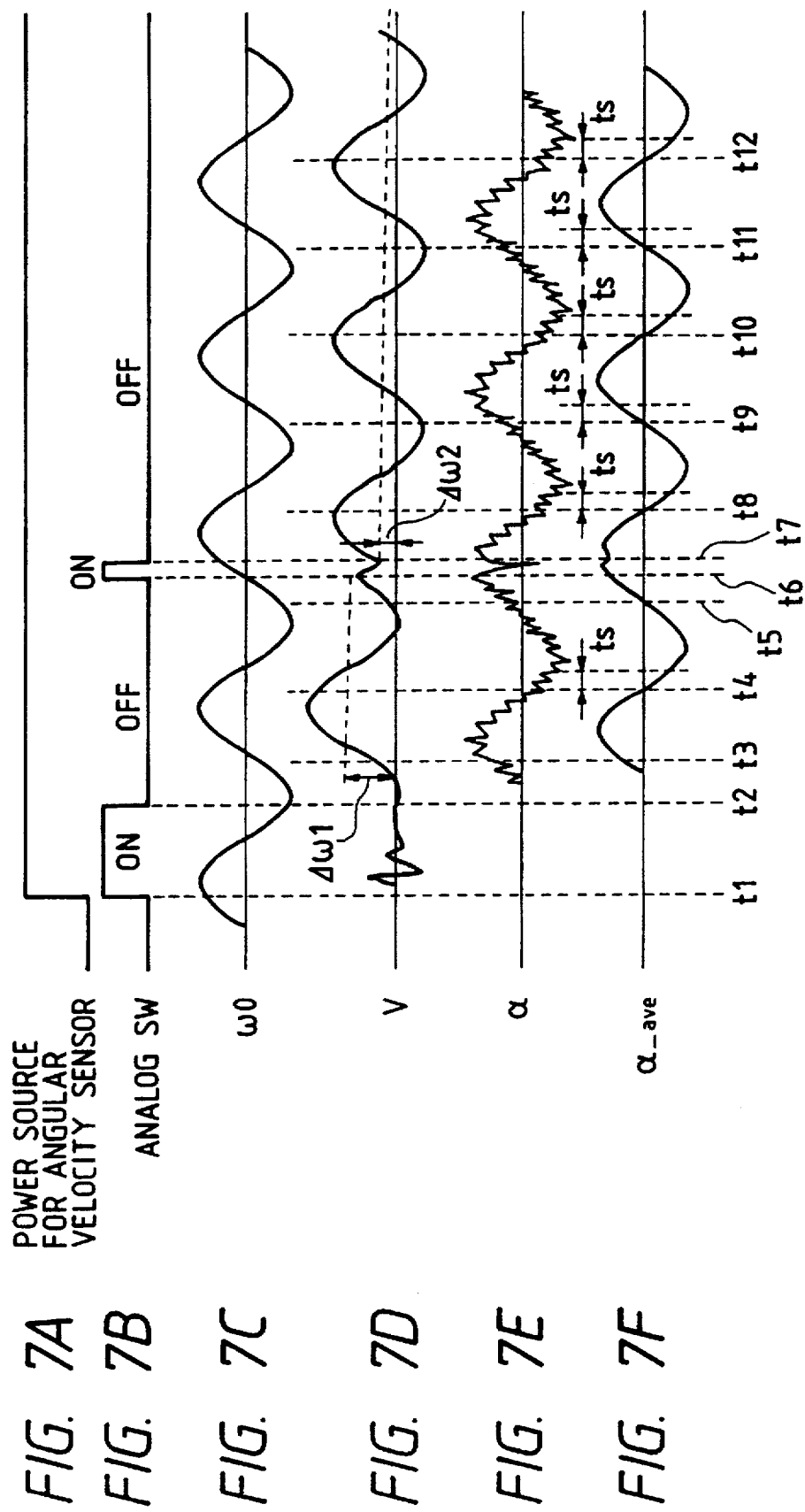
FIGS. 7A to 7F are views illustrating waveforms indicating the timings at several positions of the circuit shown in FIG. 6.
Figure 8:
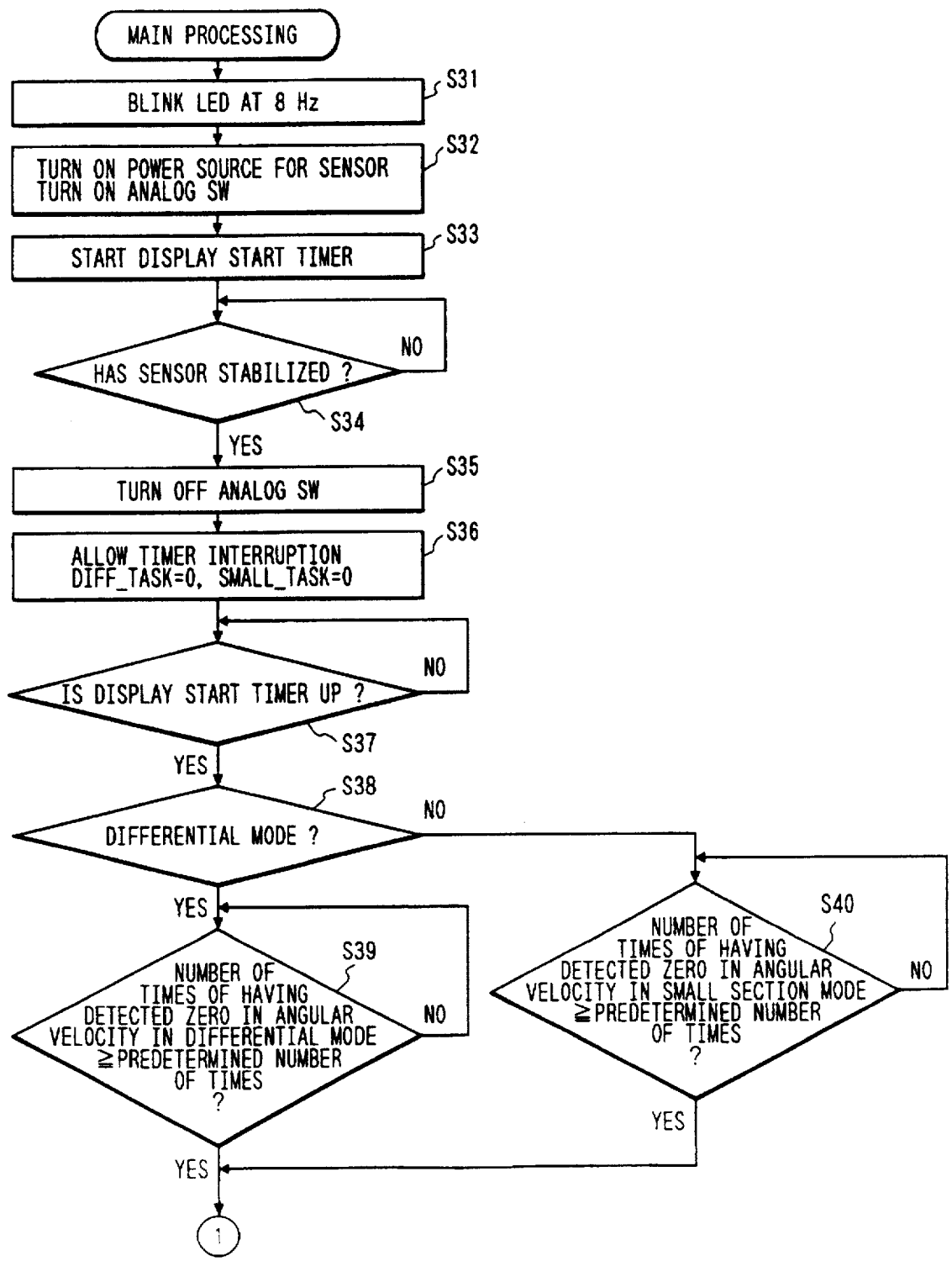
FIG. 8 is a flow-chart showing a main process of a CPU in the second embodiment.
Figure 9:
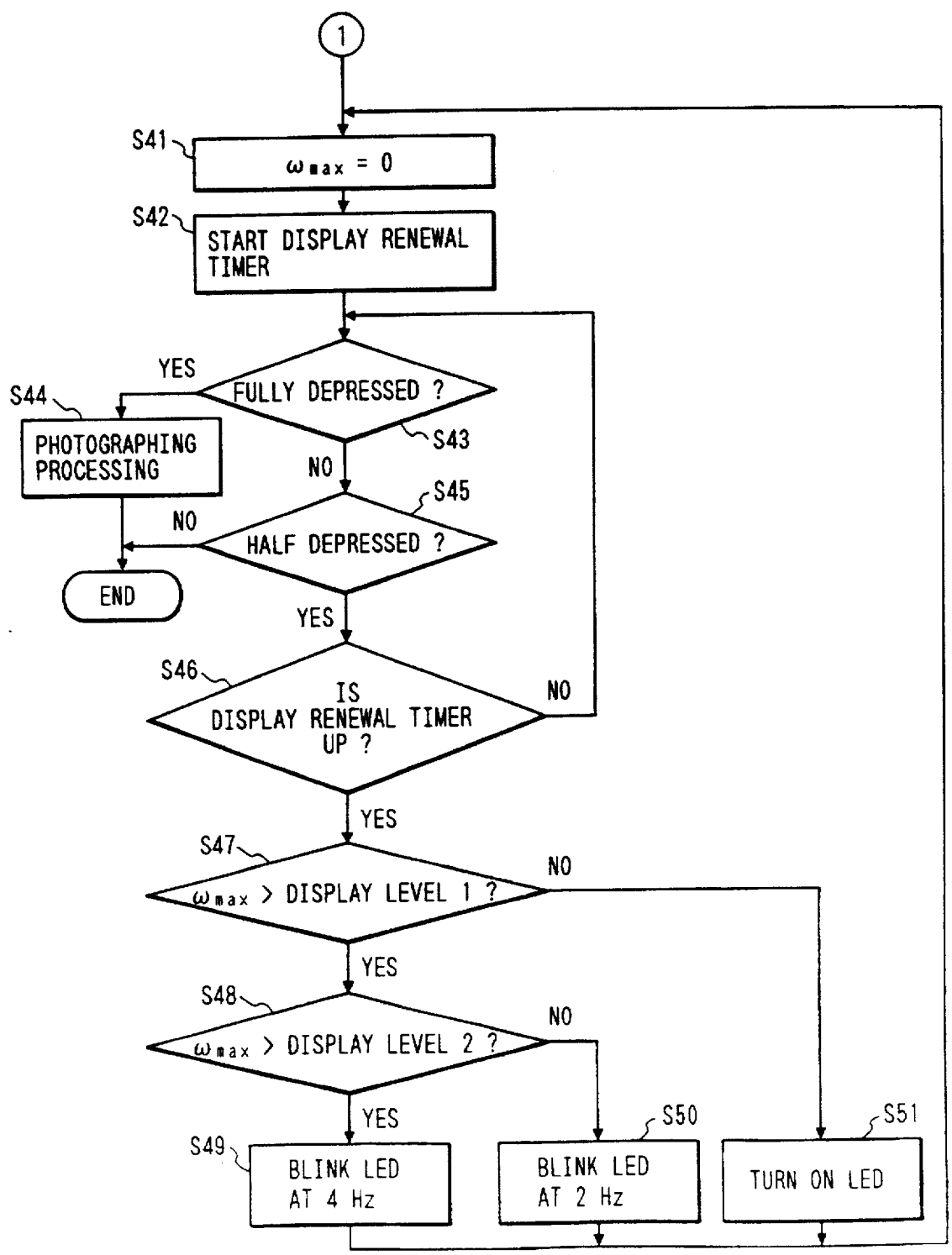
FIG. 9 is a flow-chart following FIG. 8.

FIGS. 7A to 7F are views which show output waveforms from the angular velocity sensor 11, and the high pass filter and operational amplifier 3, and FIGS. 8 and 9 are flowcharts which show a main process performed by the CPU 14A. Explanation will be made of the operation of the second embodiment with reference to these figures. When the switch 2 which is associated with half depression of a release button which is not shown is turned on, the CPU 14A initiates the process shown in the flow-charts in FIGS. 8 and 9.

At step S31, the LEDs in the display circuit 15A are flashed at 8 Hz so as to indicate that the preparation for initiating the detection of the angular velocity is not yet completed. It is noted that the condition in which the preparation for initiating the detection of the angular velocity is not yet completed, is such as that before a voltage level corresponding to an output of angular velocity sensor which indicates zero angular velocity is calculated.

At step S32, a power is fed to the angular velocity sensor 11, and further, the analog switch SW1 is turned on (during a period from t1 to t2 in FIG. 7B). Accordingly, the angular velocity sensor 11 delivers a voltage which varies in accordance with an angular velocity. Meanwhile, the operational amplifier OP delivers a voltage of about 0 volt.

At step S33, Timer measurement by the display initiating timer is initiated. This display initiating time measures a time by which the above-mentioned offset value Δω is sufficiently decrease, and precise measurement can be carried out.

At step S34, whether the output of the angular velocity sensor 11 is stabilized or not is determined. Since the output of the angular velocity sensor 11 fluctuates for a while after the power is turned on, at this step 34, whether the output of the angular velocity sensor 11 is stabilized or not can be determined by determining whether a predetermined time, for example, about 300 ms, has elapsed or not.

If the determination at step S34 is denied, the procedure dwells at step S34, but if the determination is affirmed, the procedure is shifted to step S35. At step S35, the analog switch is turned off (t2 in FIG. 7B). Accordingly, an output corresponding to an angular velocity ω caused by a slight motion is delivered to the CPU 114A from the operational amplifier OP so as to be A/D converted. The voltage after being A/D converted will be hereinbelow denoted as a A/D converted output V (Refer to FIG. 7D).

Figure 13:
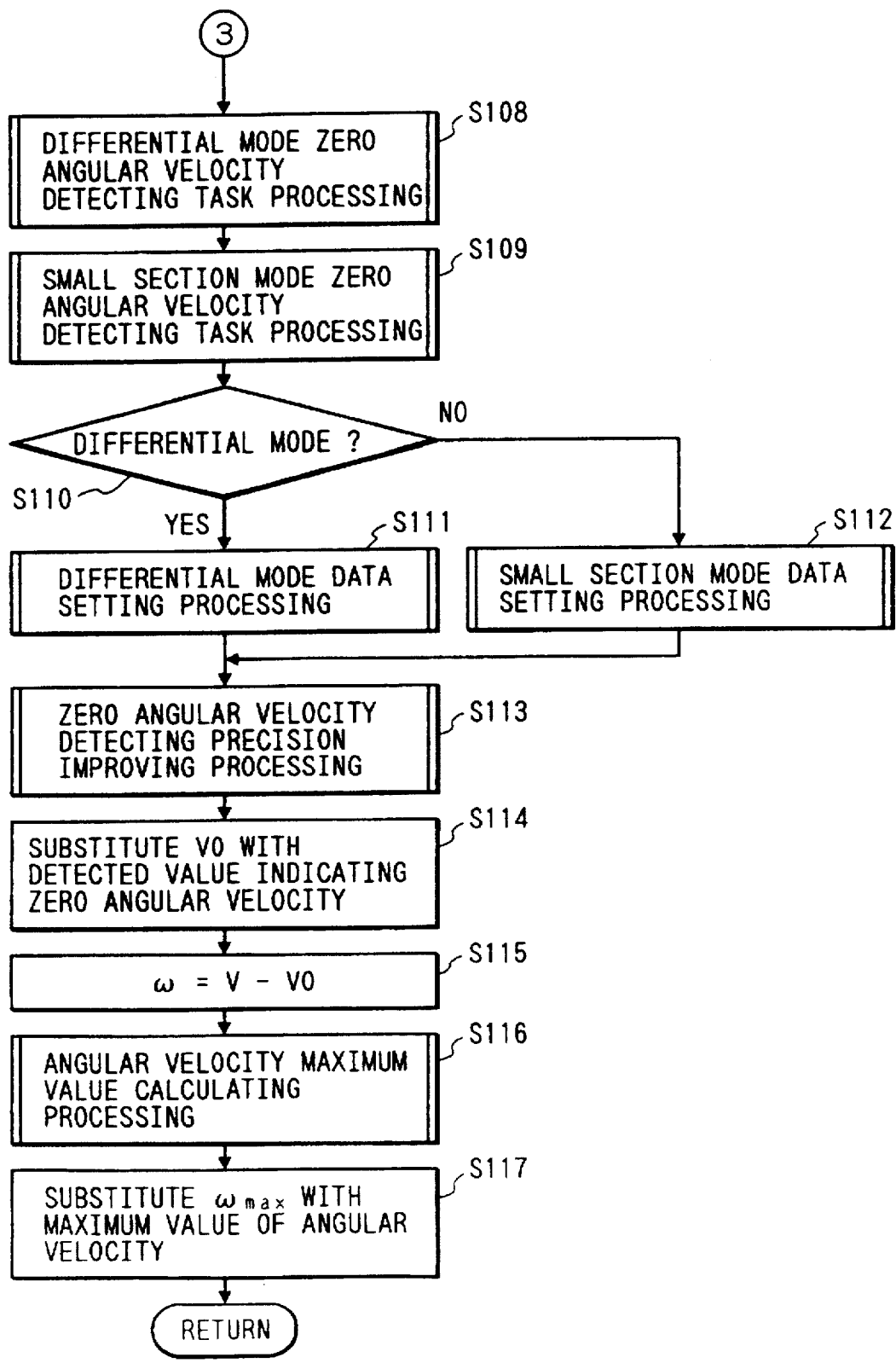
FIG. 13 is a flow-chart following FIG. 12.
Figure 14B:
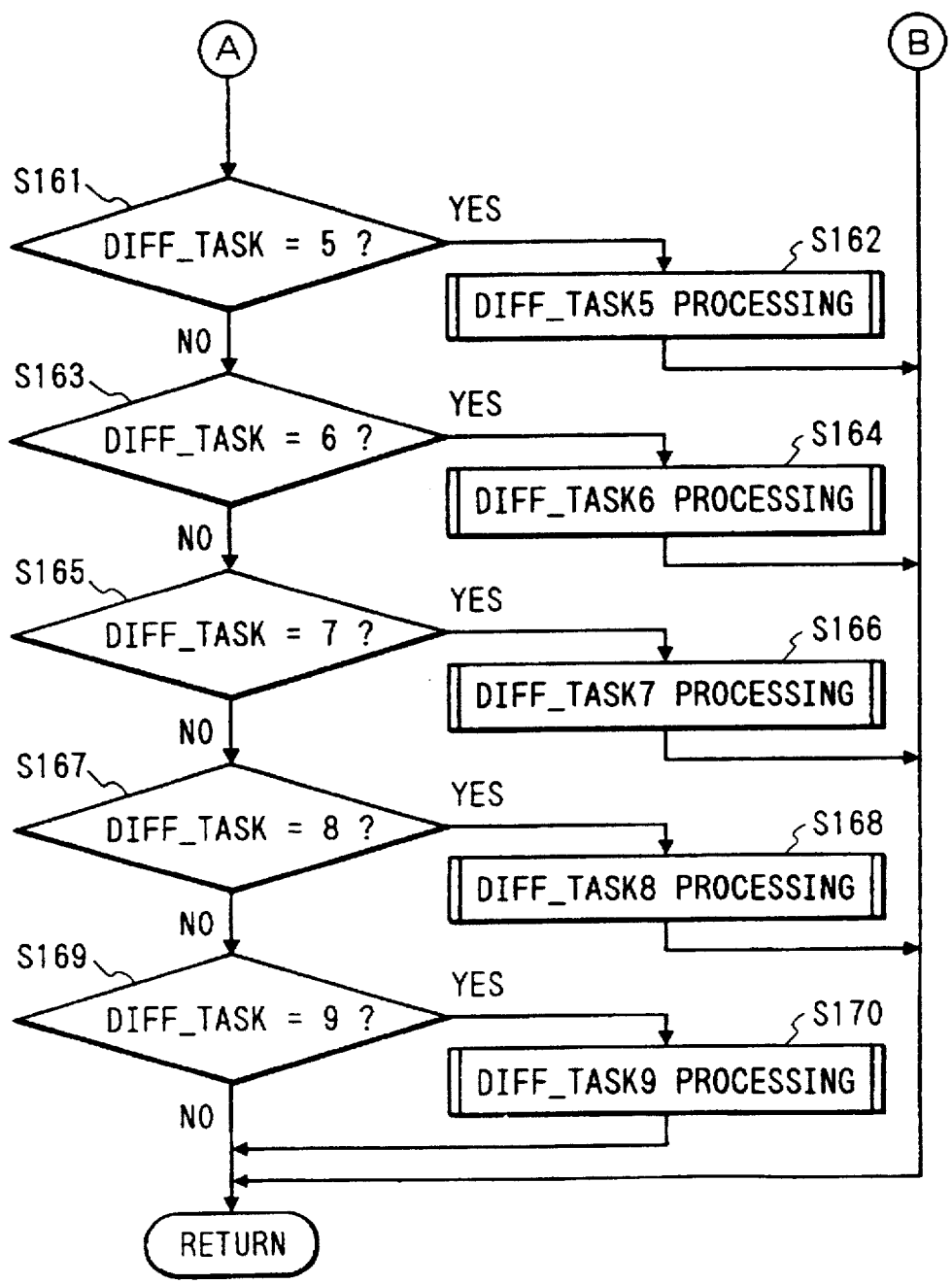
FIG. 14 is comprised of FIGS. 14A and 14B illustrating flow-charts showing a differentiating system zero angular velocity detection task process.
Figure 25:
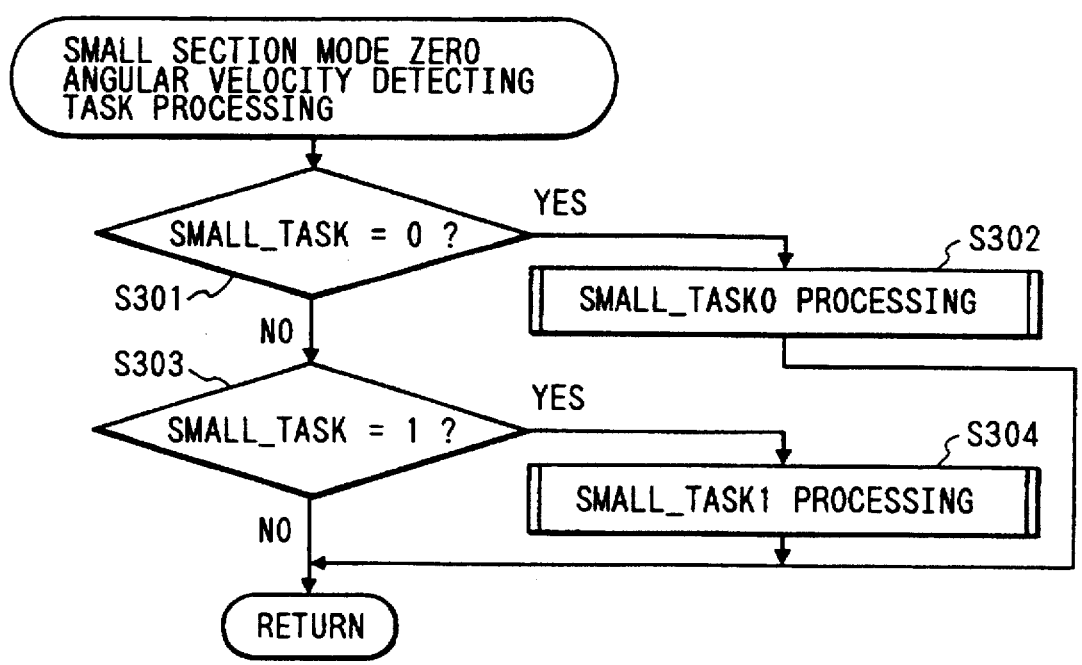
FIG. 25 is a flow-chart showing a small interval system zero angular velocity detection task process.

At step S36, timer interruption which will be hereinbelow explained is permitted. Thus, a timer interruption process which will be hereinbelow explained is carried out at every predetermined time, for example, at every 1 ms. If the time interruption is effected, the CPU 14A interrupts the main process, but carries out the timer interruption process as shown in FIGS. 10 to 13. At step S36, in addition to that mentioned above, variables DIFF_TASK, SMALL_TASK are both initially set to "0" which are used in a process which will be hereinbelow explained and which is shown in FIGS. 14A, 14B and 25.

At step 37, whether the display initiating timer's time is up is determined, and the procedure dwells at step S37 until the time is up. When it is determined that the time is up, the procedure advances to step S38. If the display initiating timer's time is up, the CPU 14A determines that the above-mentioned offset value Δω becomes sufficiently small, and therefore initiates the detection of slight motion by the angular velocity sensor 11.

At step S38, whether or not the differentiating mode is carried out for the zero angular velocity detecting process is determined. The zero angular velocity detecting process is for detecting a zero level of the A/D converted output V, and as the processing mode, the differentiating mode and the small interval mode can be enumerated, which will be hereinbelow exemplified. If the determination at step S38 is affirmed, that is, if the process is carried out in the differentiating mode, the procedure advances to step S39. Meanwhile the determination at step S38 is denied, that is, if the process is carried out in the small interval mode, the procedure is advanced to the step S40.

At step S39, whether the frequency with which the zero angular velocity detection in the differentiating mode is carried, exceeds a predetermined frequency or not, is determined. If the determination is denied, the procedure dwells at step S39, but if the determination is affirmed, the procedure is advanced to step S41 shown in FIG. 9. At step S41, a maximum angular velocity ωmax which is obtained by the timer interruption process which will be hereinbelow explained is initially set to "0".

At step S42, timer measurement by a timer for measuring display updating intervals of the display circuit 15A (which will be hereinbelow denoted as a display updating timer) is initiated. In this second embodiment, the display of the display circuit 15A is changed in accordance with slight motion. However, should the display be often changed, the cameraman would be confused. Accordingly, for example, a time of about 500 ms is measured by the display updating timer, and therefore, the display of the display circuit 15A is updated at every measured time.

At step S43, whether the release button which is not shown is fully depressed is determined. If the determination is affirmed, the procedure advances to step S44. The image shooting is carried out and is then ended. In this image shooting, the correcting lens which is not shown is moved in accordance with the slight motion while the opening and closing of the shutter is carried out, and thereafter, the supply of power to the angular velocity sensor 11 is ceased.

If the determination at step S43 is denied, the procedure is advanced to step S45 at which whether the release button which is not shown is halfly depressed or not is determined. If the determination is denied, the process is completed, but if the determination is affirmed, the procedure is advanced to step S46 at which whether the display updating timer's which has been started at step S42, times is up is determined. If the determination is denied, the procedure returns to step S43, but if the determination is affirmed, the procedure advances to step S47.

At step S47, whether the maximum angular velocity ωmax is larger than the display level 1 is determined. If the determination is affirmed, the procedure advances to step S48 at which whether the maximum angular velocity ωmax is larger than the display level 2 is determined. If the determination is affirmed, the procedure advances to step S49 at which the LEDs in the display circuit 15A are flashed at 4 Hz so as to indicate that the slight motion is large, and then the procedure is returned to step S41. The slight motions at the above-mentioned display levels 1, 2, are about 5 deg. per sec and 10 deg. per sec, respectively, The determination at step S48 is denied, the procedure advances to step S50 at which the LEDs of the display circuit 15A are flashed at 2 Hz so as to indicate that the slight motion is intermediate, and then the procedure is returned to step S41. If the determination at step S47 is denied, the procedure advances to step S15 at which the LEDs of the display circuit 15A are merely turned on without being flashed so as to indicate that the slight motion is small, and then the procedure returns to step S41.

Thus, in the main process shown in FIGS. 8 and 9, after the output of the angular velocity sensor 11 is stabilized, the analog switch SW1 is turned off, and after waiting until the offset value of the output of the angular velocity sensor 11 becomes small, the indication of the slight motion is carried out at every predetermined time in accordance with the maximum angular velocity value ωmax calculated by the timer interruption.

FIGS. 10 to 13 are flow-charts which show the timer interruption process. At step S36 in FIG. 8, when the timer interruption process is permitted, the CPU 14A carries out the timer interruption process shown in FIGS. 10 to 13 at intervals of, for example, 1 ms. During this timer interruption process, the detection of a zero level of the outputs of the angular velocity sensor 11, and the calculation of the maximum angular velocity value are carried out. Two kinds of timer interruption processes are present as shown in FIGS. 10 and 11, and FIGS. 12 and 13, respectively. Accordingly, the CPU 14A carries out either one of these kinds. Either of these kinds which is carried out is determined by the cameraman who previously designates it by means of a switch or the like which is not shown.

At step S61 in FIG. 51, the variables j, k, n are each added with 1. The variables j, k, n are all adapted for measuring the frequency with which the interruption is effected. Of these variables, the variable j is once reset to zero on the way of the measuring, but the variable k measures the total frequency of the timer interruption. Further, the variable n measures the frequency of the zero angular velocity detection in the small interval mode.

At step S62, the value of a variable V(0) is substituted into a variable V(1). It is noted that an A/D converted output value measured just before is substituted into the variable V(0).

At step S63, the present A/D converted output value is substituted into the variable V(0). At step S64, α(6) is substituted into a variable α(7) into which an angular acceleration value is substituted, and similarly, substituted are α(5) into α(6), α(4) into α(5), α(3) into α(4), α(2) into α(3), α(1) into α(2), and α(0) into α(1). It is noted that angular acceleration value is calculated at the next step S65, the variables α(n) (n=0 to 7) are substituted therein with angular acceleration values which are calculated at times nearer to the present time as the value of n is smaller. That is, the angular acceleration values at latest eight times are normally stored in the variables α(n) (n=0 to 7).

At step S65, as shown in the following formula (4), an angular velocity is calculated from a difference between the variable V(0) and the variable V(1), and the thus calculated value is substituted into the variable α(0):

$$\alpha(0)=V(1)-V(0) \tag{4}$$

The waveform of the angular acceleration α calculated by use of the formula (4) is shown in FIG. 7E. As shown, the angular acceleration α becomes zero when the amplitude of the A/D converted output V is maximum and minimum. Further, the calculated angular acceleration a varies being affected by high frequency component noise. In order to reduce such high frequency component noise, the averaged value of the angular accelerations at the past eight times is calculated by use of the formula (5), and the thus obtained result is substituted into the variable α_ave. The averaged value is calculated by use of the following formula so as to remove the high frequency component noise as shown in FIG. 7F.

$$\alpha\_ave = \left\{ \sum_{i=0}^{n-1} \alpha(i) \right\} / n \tag{5}$$

It is noted that the angular accelerations at the past eight times may be weighed and then averaged with the use of the following formula (6) instead of the formula (5):

$$\alpha\_ave = \left\{ \sum_{i=0}^{n-1} \{k1(i) \cdot \alpha(i)\} \right\} / \left\{ \sum_{i=0}^{n-1} \{k1(i)\} \right\} \tag{6}$$

The above-mentioned expression is adapted to weigh the angular accelerations at the past eight times with the coefficients K1(i) (i=0 to 7). For example, those of the coefficients k1(i) which are nearest to the present are made to be larger so that more precise angular accelerations can be obtained from the formula (6).

At step S67, as shown in the formula (7), the variable V(0) into which the present A/D converted output value has been substituted is added to a variable W1 which is used in the case of the zero angular velocity detection in the differentiating mode.

$$W1=W1+V(0) \tag{7}$$

At step S68, as shown in the following formula (8), the variable V(0) is added to a variable W2 which is used in the case of the zero angular velocity detection in the small interval mode.

$$W2=W2+V(0) \tag{8}$$

Accordingly, the added-up value of the A/D converted output values is substituted into the variables W1 and W2.

At step S69, the differentiating mode zero angular velocity detection task process is carried with the use of a process which is shown in FIGS. 14A and 14B and which will be hereinbelow explained. In this differentiating mode zero angular acceleration task process, the offset values is reduced, and the zero level of the A/D converted output is detected. At step S70, the small interval mode zero angular velocity detection task process is carried by a process which shown in FIG. 25 and which will be hereinbelow explained.

In this small interval mode zero angular velocity detection task process, the zero level of the A/D converted output is detected. The zero level of the A/D converted output detected by the zero angular velocity detection task process in the differentiating mode or the small interval mode will be denoted as a detected zero angular velocity value.

Figure 28:
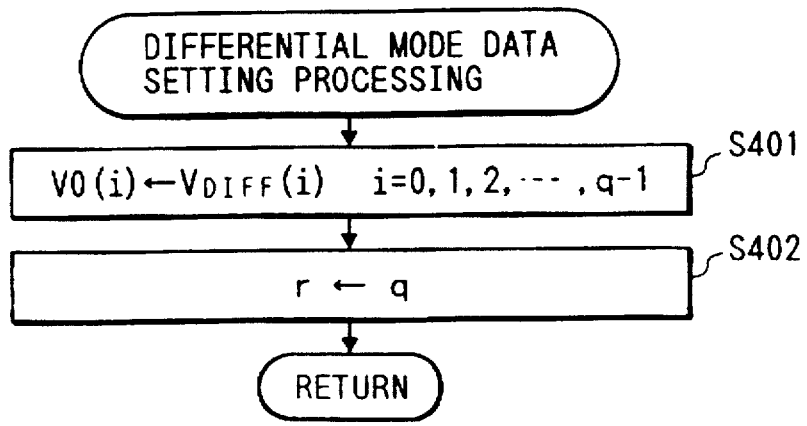
FIG. 28 is a flow-chart showing a differentiating system data setting process.

If the determination at step S71 is affirmed, the procedure is advanced to step S72 at which a differentiating mode data setting process shown in FIG. 28 is carried out, and then the procedure is advanced to step S74. In this differentiating mode data setting process, the detected zero angular velocity value $V_{DIFF}(i)$ calculated by the differentiating mode zero angular velocity detection task process is substitute into $V_0(i)$.

Figure 29:
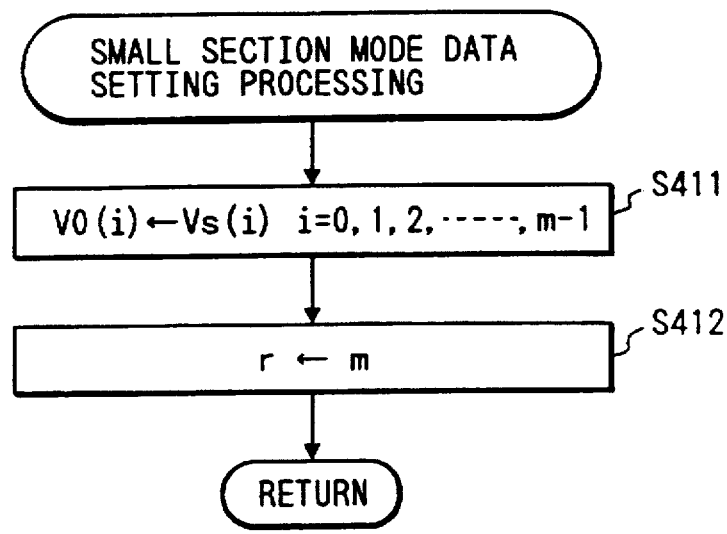
FIG. 29 is a flow-chart showing a small interval detecting system data setting process.

If the determination at step S71 is denied, the procedure advances to step S73 at which the small interval mode data setting process shown in FIG. 29 is carried out, and then the procedure advances to step S74. In this small interval mode data setting process, the detected zero angular velocity value $V_s(i)$ calculated by the small interval mode zero angular velocity detection task process is substituted into the variable $V_0(i)$.

Figure 30:
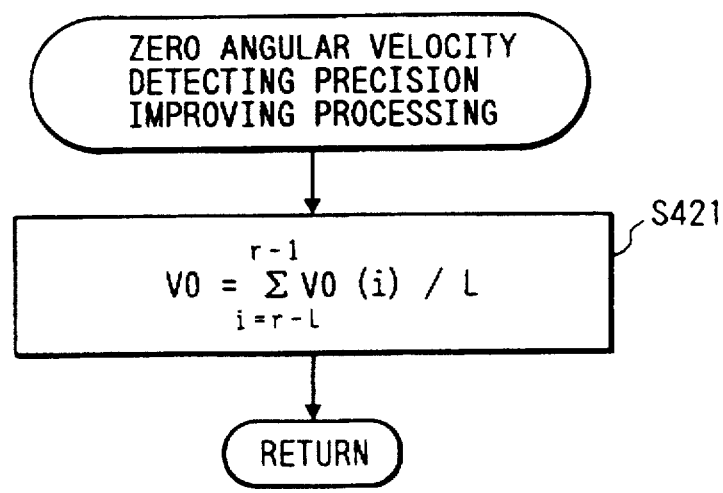
FIG. 30 is a flow-chart showing a zero angular velocity detecting precision improving process.
Figure 31:
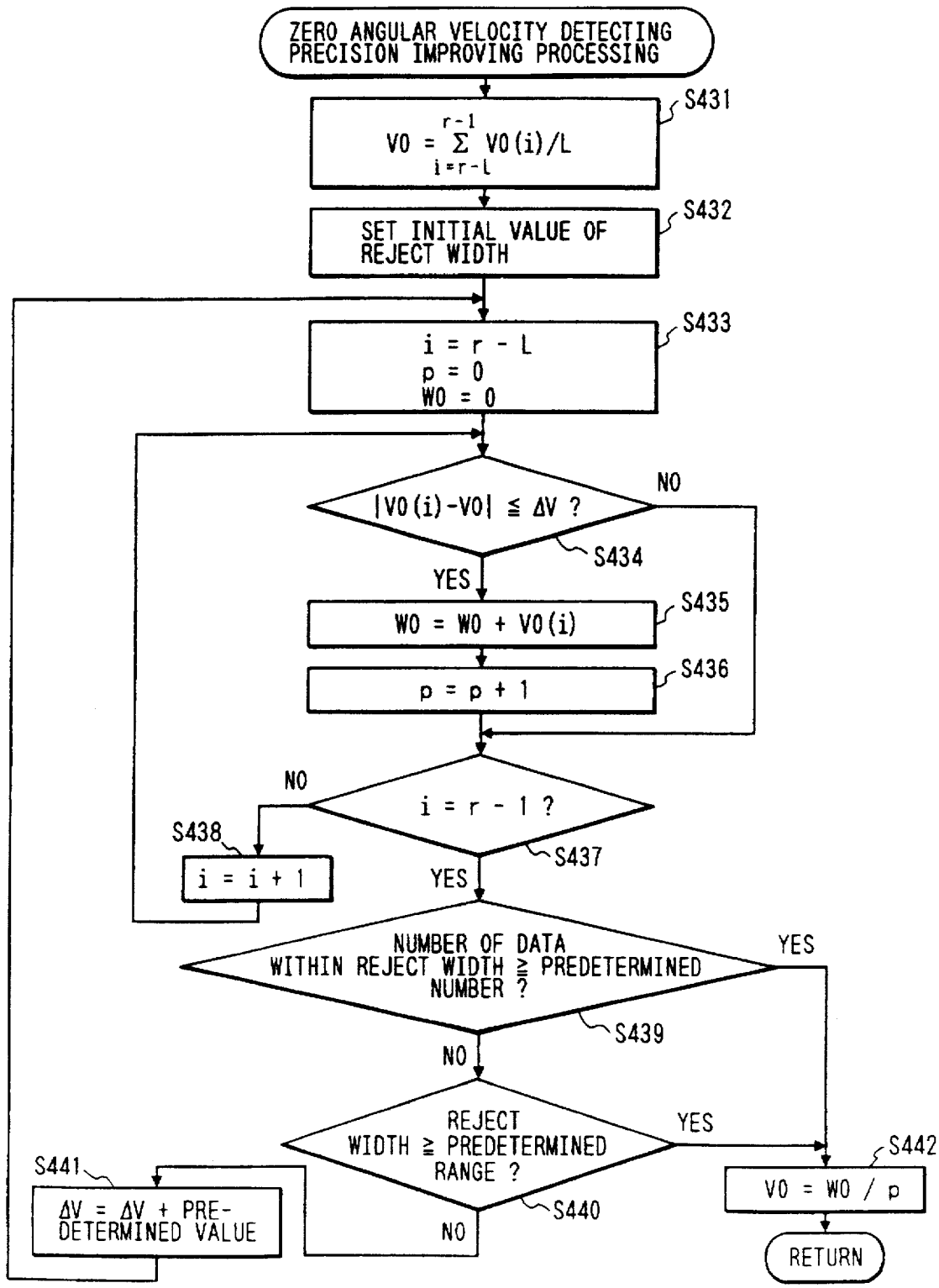
FIG. 31 is a flow-chart showing a zero angular velocity detecting precision improving process.
Figure 32:
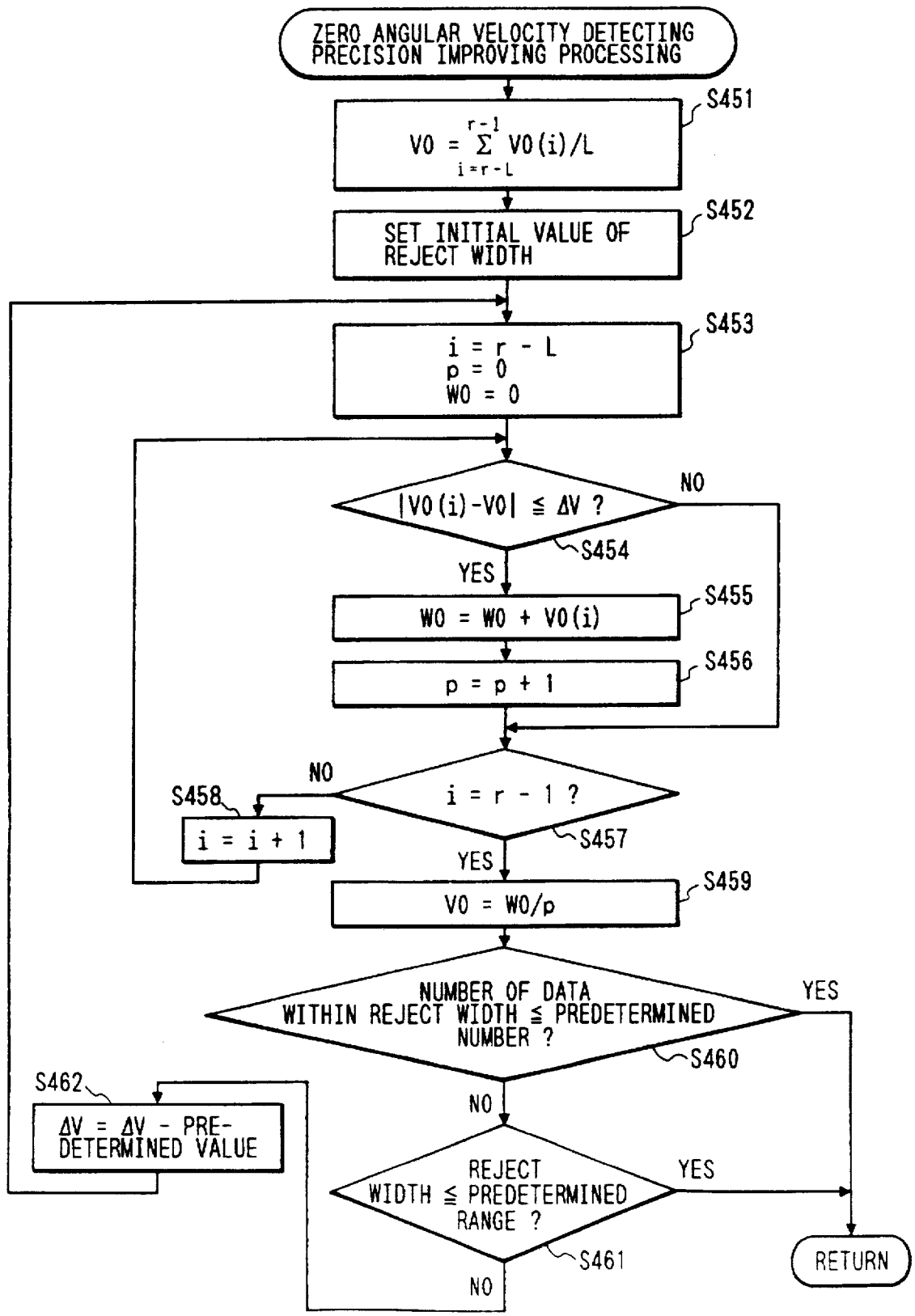
FIG. 32 is a flow-chart showing a zero angular velocity detecting precision improving process.

At step S74, an zero angular velocity detecting precision improving process shown in FIGS. 30 to 32 is carried out. In this zero angular velocity detecting precision improving process, those of the detected zero angular velocity values substituted in the variables $V_0(i)$ (i=0, 1 ... r−1), which fall in a specific range, are extracted so as to enhance the precision of the zero level detection.

At step S75, the detected zero angular velocity value calculated at step S74 is substituted into the variable $V_0$. That is, the final detected zero angular velocity value is substituted into $V_0$.

At step S76, a true angular velocity ω is calculated from a difference between the A/D converted output value and the detected zero angular velocity value as shown in the following formula (9):

$$\omega = V - V_0 \tag{9}$$

Figure 35:
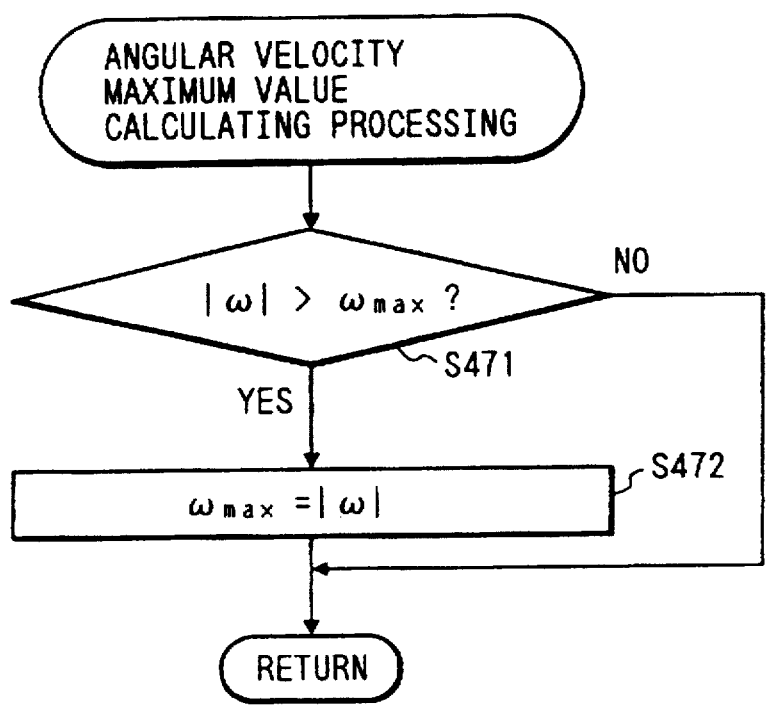
FIG. 35 is a flow-chart showing an angular velocity maximum value calculating process.
Figures 36A, 36B, 36C, 36D:
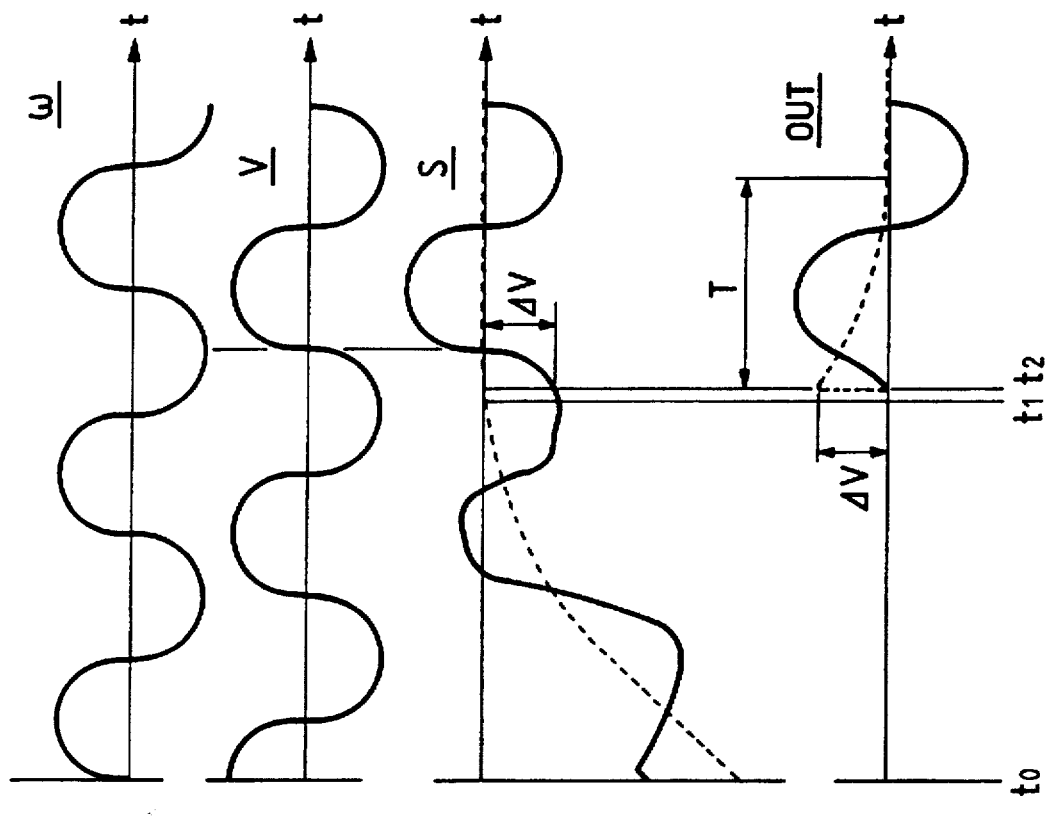
FIGS. 36A to 36D are views showing waveforms which exhibit conventional operation of the slight motion detecting device shown in FIG. 1.
Figure 37:
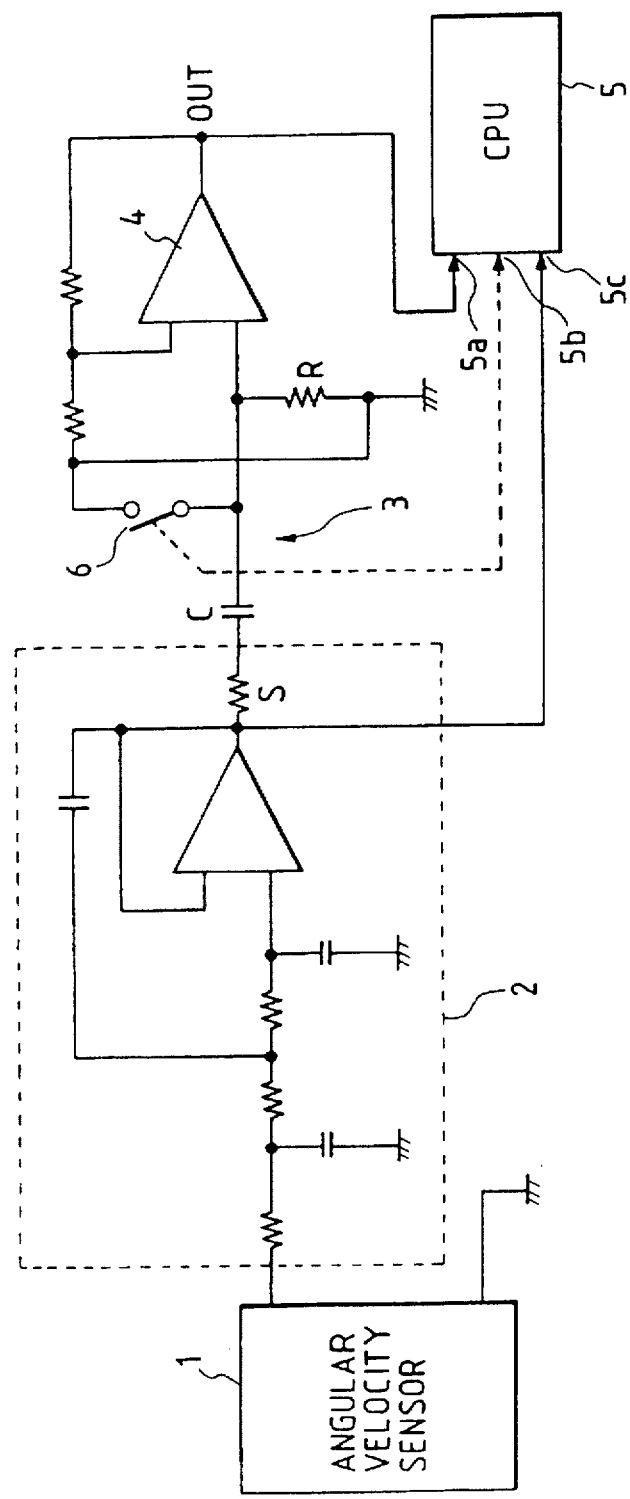
FIG. 37 is a circuit block diagram illustrating a slight motion detecting device proposed by the present assignee and disclosed in Japanese Patent Application No. 5-190876.
Figures 38A, 38B, 38C, 38D, 38E:
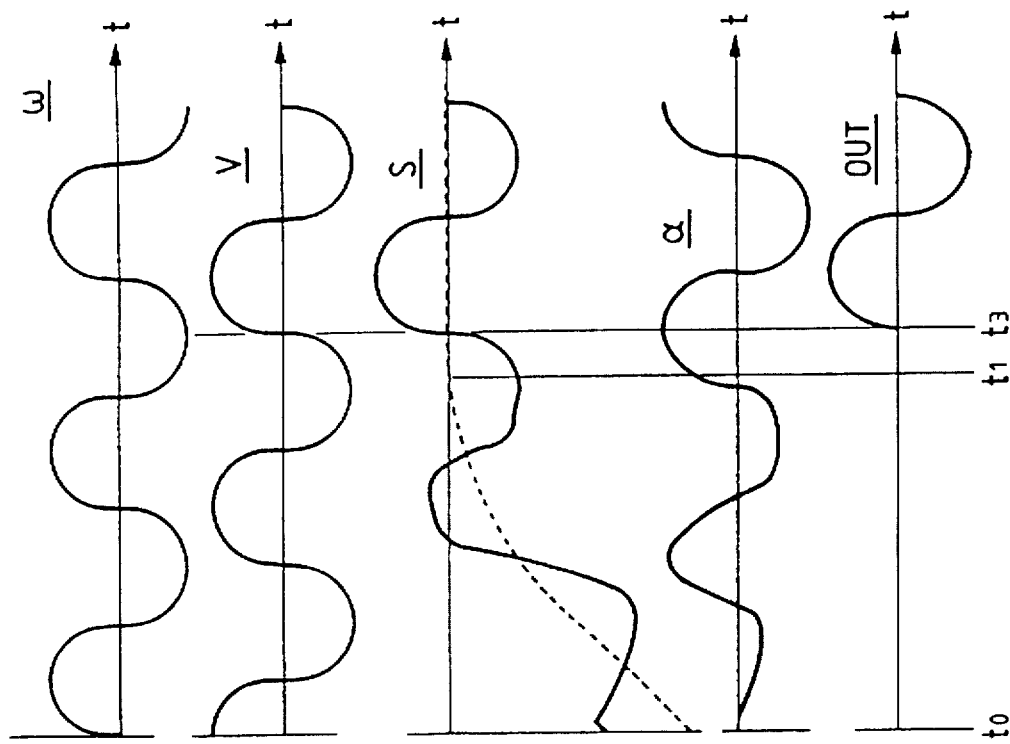
FIGS. 38A to 38E are views illustrating waveforms at several positions in the circuit shown in FIG. 37.

At step S77, a maximum angular velocity value calculating process shown in FIG. 35 is carried out, and then the result thereof is substituted into a variable ωmax at step S78 before the procedure is returned. In this maximum angular velocity calculating process, the largest one of the angular velocities ω calculated at step S76 is detected.

Figure 10:
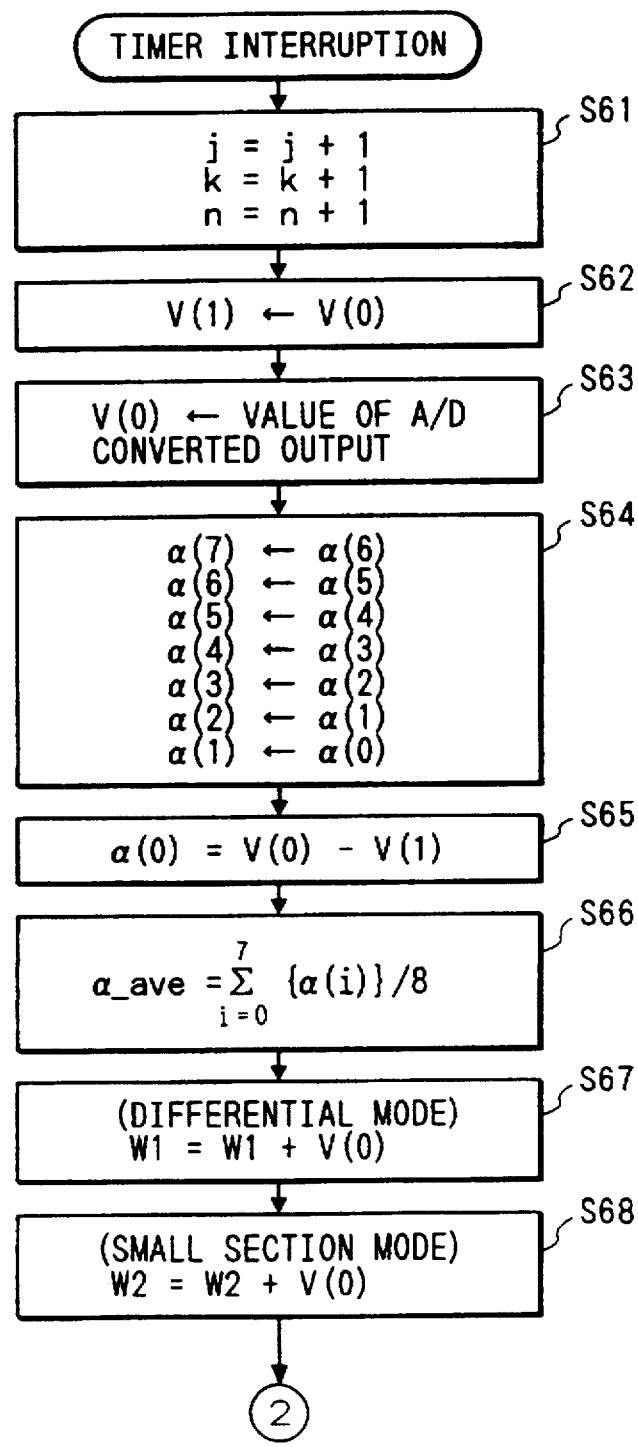
FIG. 10 is a flow-chart showing a timer interrupting handling by the CPU in the second embodiment.
Figure 11:
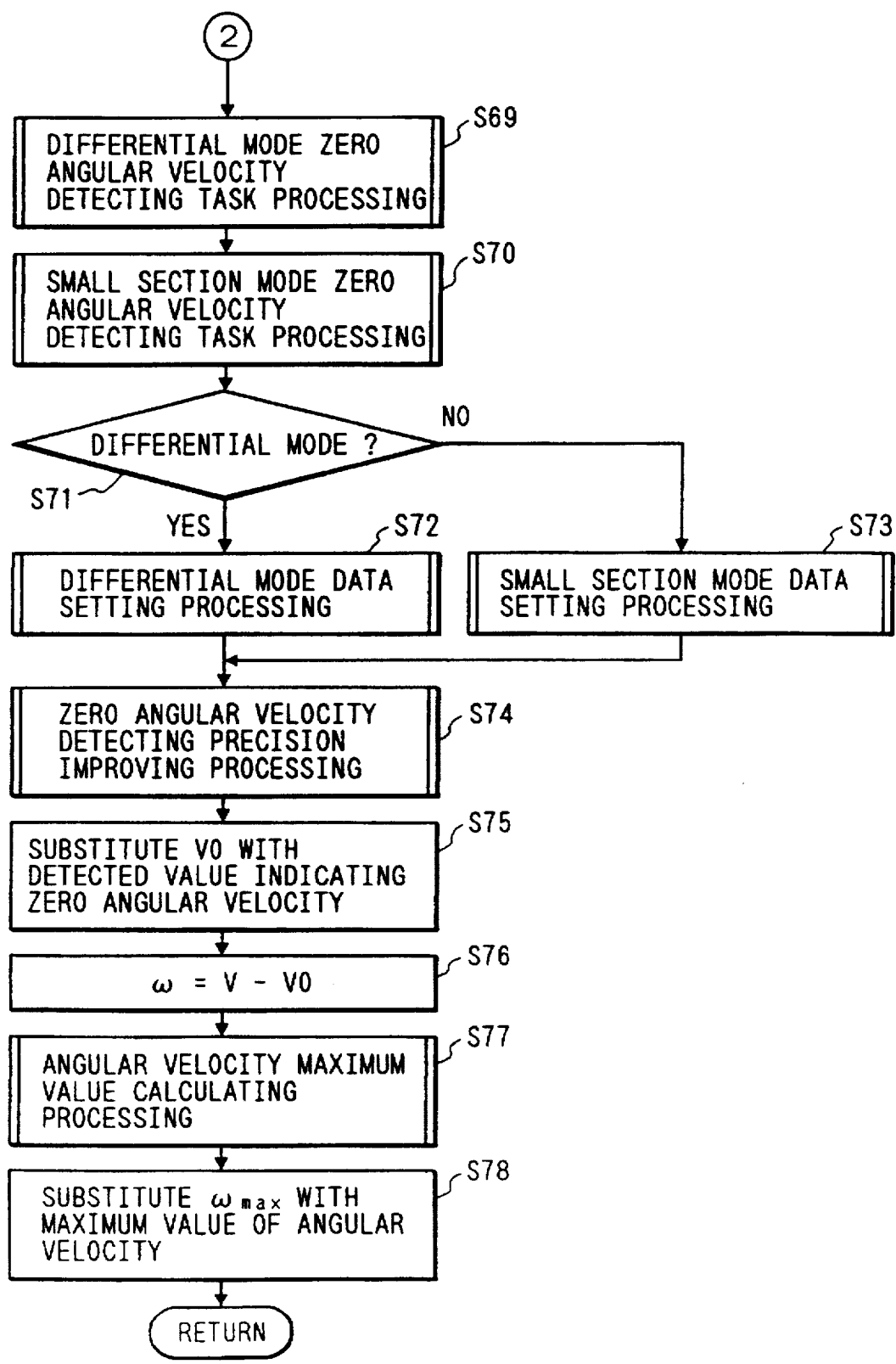
FIG. 11 is a flow-chart following FIG. 10.

Thus, in the timer interruption process shown in FIGS. 10 and 11, The CPU 14A is interrupted at every predetermined time so as to carry out the calculation of the averaged value of the angular accelerations, the reduction of the offset error, the detection of the zero level of the angular velocity and the like, and accordingly, the output of the angular velocity sensor 11, that is, the slight motion can be precisely detected.

During the timer interruption process shown in FIGS. 10 and 11, the angular velocity is calculated from the difference between the A/D converted outputs, and thereafter, the averaged value of the angular accelerations is obtained. However, as shown in FIGS. 12, 13, after the averaged value of the A/D converted outputs is obtained, the angular acceleration may be obtained by calculating a difference therebetween.

Figure 12:
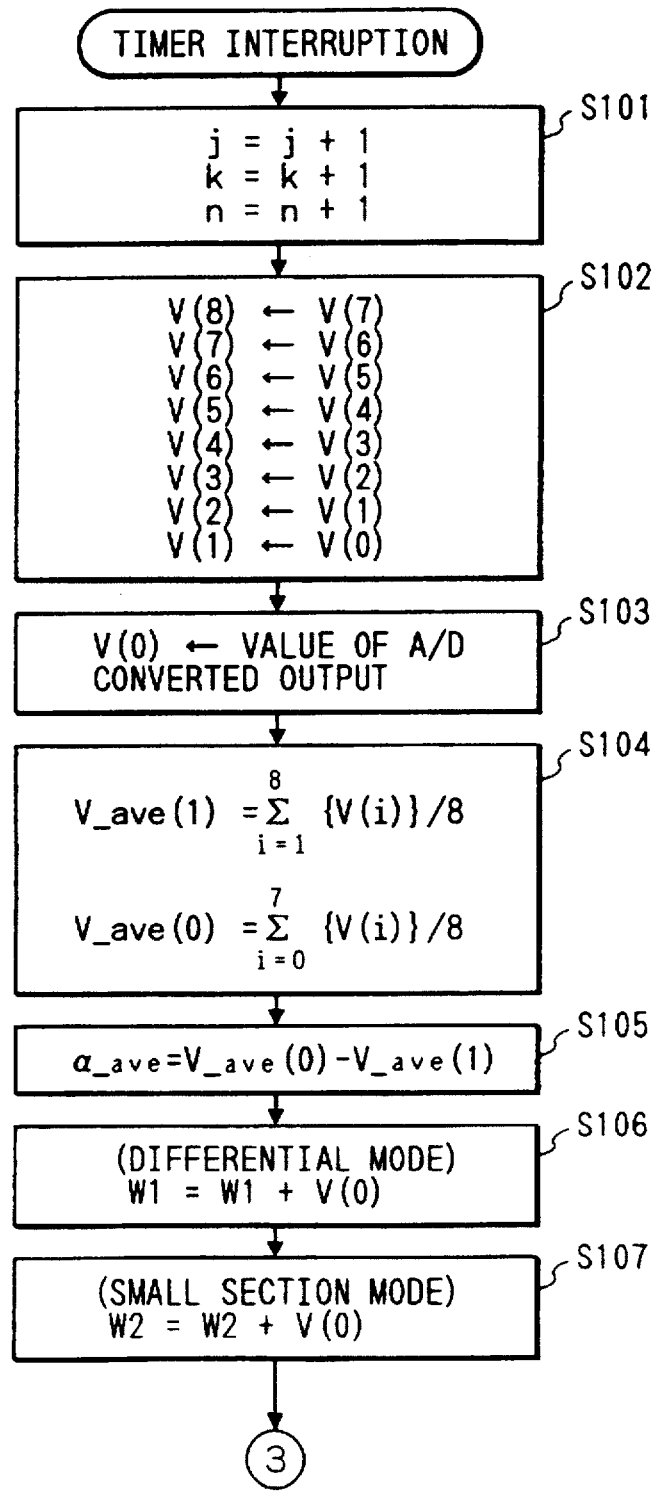
FIG. 12 is a flow-chart showing a timer interrupting handling by the CPU in the second embodiment.

At step S10 shown in FIG. 12, a process similar to step S61 shown in FIG. 10 is carried out, and at step S102, V(7) is substitute into the variable V(8) into which the A/D converted output is substituted, and similarly, substituted are V(6) into V(7), V(5) into V(6), V(4) into V(5), V(3) into V(4), V(2) into V(3), V(1) into V(2) and V(0) into V(1). The A/D converted outputs which have been measured at times which are near to the present as the value n is smaller, are substitute into the variables V(n) (n=0 to 7).

At step S102, the present A/D converted output is substitute into V(0). A process similar to the process at step S63 is carried out at step S103, and then the averaged value Vave (0) of the A/D converted outputs at eight times from the present to the past, and the Vave(1) of the A/D converted outputs at eight times from the previous time to the past are calculated.

$$V\_ave(1) = \left\{ \sum_{i=1}^{n} V(i) \right\} / n \tag{10}$$

$$V\_ave(0) = \left\{ \sum_{i=0}^{n-1} V(i) \right\} / n \tag{11}$$

Further, instead of the formulae (10) and (11), the averaged value of the A/D converted outputs at the past eight times is weighed before averaging.

$$V\_ave(1) = \left\{ \sum_{i=1}^{n} \{k2(i) \cdot V(i)\} \right\} / \sum_{i=1}^{n} \{k2(i)\} \tag{12}$$

$$V\_ave(0) = \left\{ \sum_{i=0}^{n-1} \{k2(i) \cdot V(i)\} \right\} / \left[ \sum_{i=0}^{n-1} \{k2(i)\} \right] \tag{13}$$

These formulae (12) and (13) are adapted to weigh the A/D converted outputs at the past n times with the coefficients k2(i) (i=0 to 7). If those of the coefficients k2(i) corresponding to the A/D converted outputs which are near to the present are set to be larger, the angular velocity which are more precise than that obtained from the formulae (10) and (11) can be obtained.

At the step S105, an averaged value α_ave of the angular acceleration is calculated.

$$\alpha\_ave = Vave(0) - Vave(1) \tag{14}$$

At the step S106 and following steps, the same processing as at the step S67 and following steps shown in FIG. 10 is executed.

FIGS. 14A and 14B are flow charts showing the details of the differentiating mode zero angular velocity detection task process at the step S69 shown in FIG. 11. FIGS. 15 to 24 are respectively a flow chart showing the details of a processing invoked from the differentiating mode zero angular velocity detection task process. In this differentiating mode zero angular velocity detection process, reduction of the offset value Δω and calculation of the detected zero angular velocity value $V_{DIFF}$ are executed. Of DIFF_TASK0 to DIFF_TASK9 processes shown in FIGS. 15 to 24, DIFF_TASK0 to DIFF_TASK5 processes are for reduction of the offset value and DIFF_TASK6 to DIFF_TASK9 processes are for differentiating mode zero angular velocity V detection.

At the step S151, whether the variable DIFF_TASK is "0" or not is determined. This DIFF_TASK is the one for determining that either of the processes from a DIFF_TASK0 process to a DIFF_TASKn process is carried out, and if the DIFF_TASK is "n" (n=1 to 9), the DIFF_TASKn process is carried out.

Figure 15:
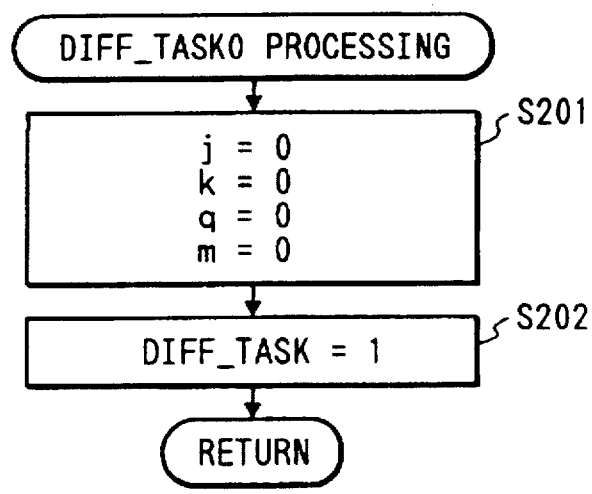
FIG. 15 is a flow-chart showing DIFF_TASK0 process.

The determination at step S151 is affirmed, the procedure is advanced to step S152 at which the DIFF_TASK0 process shown in FIG. 15 is carried out, and then the procedure is returned. In this DIFF_TASK0 process, the variables are initialized. It is noted that the DIFF_TASK0 process is carried out at a time t2 in FIG. 7F.

At step S201 in FIG. 15, any of variables j, k, q, m is initialized to "0". At step S202, the variable DIFF_TASK is set to "1" and then the procedure is returned.

Figure 16:
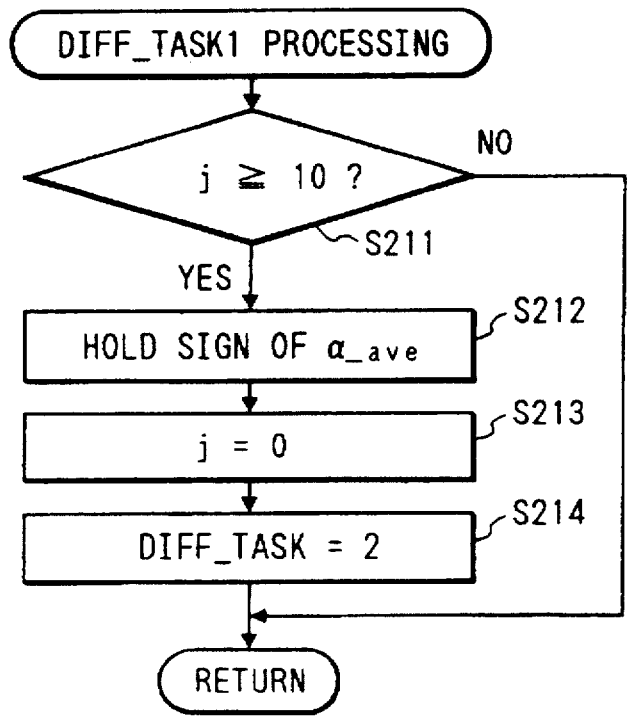
FIG. 16 is a flow-chart showing DIFF_TASK1 process.

Referring again to FIGS. 14A and 14B, if the determination at step S151 is denied, the procedure is advanced to step S153 at which whether the variable DIFF_TASK is "1" or not is determined, and if the determination is affirmed, the procedure is advanced to step S154 at which the DIFF_TASK1 process shown in FIG. 16 is carried out before the procedure is returned. In this DIFF_TASK1 process, the sign of the averaged angular acceleration value $\alpha_{13}$ave is detected. It is noted that the DIFF_TASK1 process is carried out during the period from t2 to t3 in FIG. 7F.

The averaged angular acceleration value α_ave calculated at step S66 in FIG. 10 is newly adapted at every eight times of the timer interruption, and accordingly, in the DIFF_TASK1 process, the sign of the calculated averaged angular acceleration value α_ave at the ten-th time of the timer interruption is detected with a certain margin.

At step S211 in FIG. 16, whether the variable j is "10" or not is determined, and if the determination is denied, the procedure returns. Meanwhile, the determination is affirmed, the procedure advances to step S211 at which the sign of the averaged angular acceleration α_ave calculated at step S66 is detected. At step S213, the variable j is set to "0", and then at step S214, the variable DIFF_TASK is set to "2", and the procedure returns.

Figure 17:
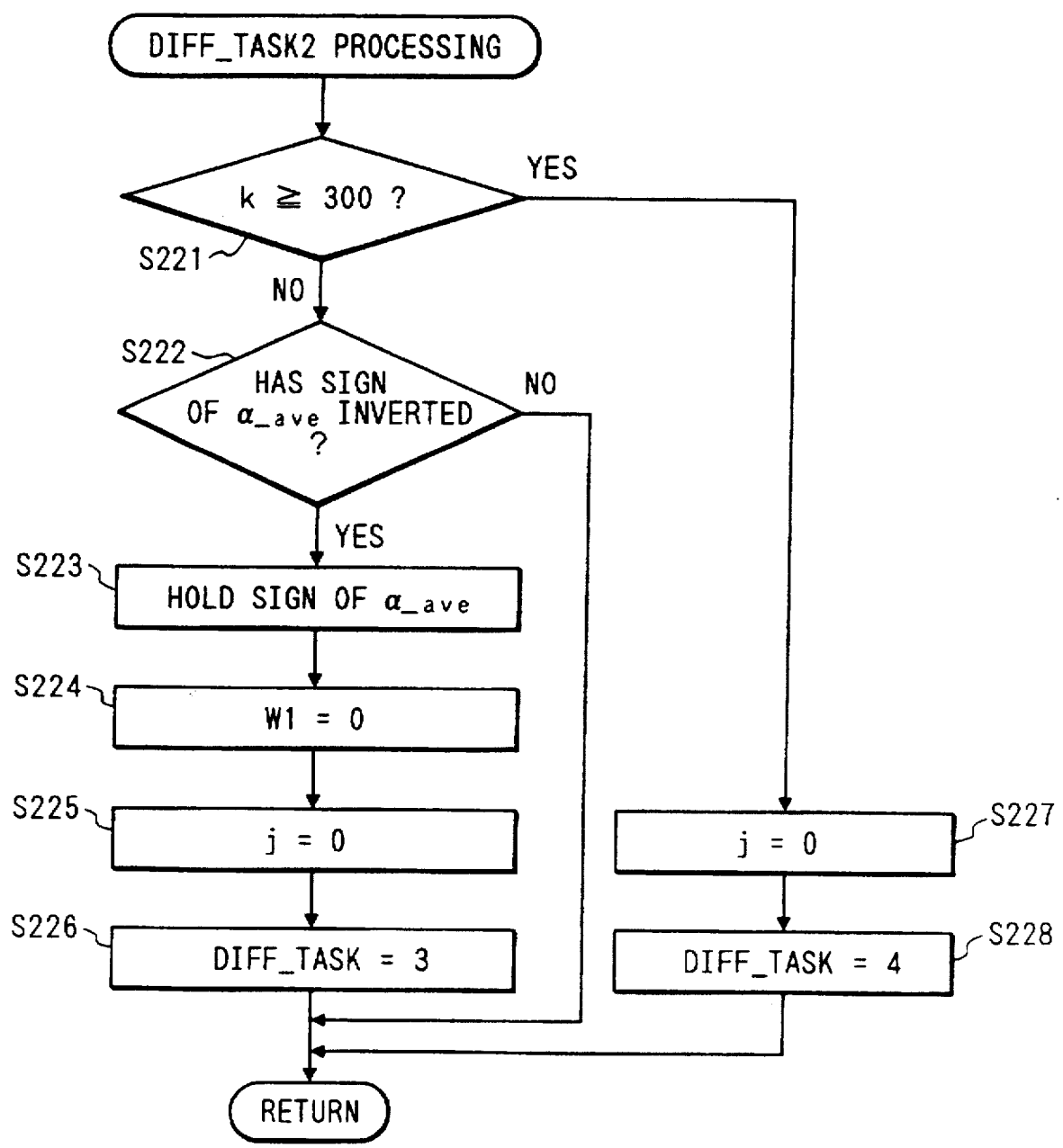
FIG. 17 is a flow-chart showing DIFF_TASK2 process.

Referring again to FIGS. 14A and 14B, if the determination is denied, the procedure is advanced to step S155 at which whether the variable DIFF_TASK is "2" or not is determined. If the determination is affirmed, the procedure advances to step S156 at which the DIFF_TASK2 process shown in FIG. 17 is carried out, and the procedure returns. It is noted that the DIFF_TASK2 process is carried out during the period from t3 to t4 in FIG. 7F.

At step S221 in FIG. 17, whether the variable k is greater than 300 or not is determined, the CPA 14A repeats the DIFF_TASK2 process until the sign of the averaged angular acceleration value α_ave is changed, and accordingly, if the sign of the averaged angular acceleration value α_ave is not changed, the DIFF_TASK2 process is infinitely repeated. Accordingly, in such a case that the sign of the averaged angular acceleration value α_ave is not changed even though 300 times of the timer interruption is carried out, the DIFF_TASK2 process is ceased. Further, for example, if a slight motion having a period longer than 300 ms occurs, the process is similarly ceased.

If the determination at step S221 is denied, the procedure advances to step S222 at which whether the sign of the averaged angular acceleration value α_ave is changed or not is determined, and if the determination is affirmed, the procedure advances to step S223 at which the sign of the averaged angular acceleration value α_ave is detected. At step S224, the added-up A/D output value W1 in the differentiating mode is set to "0". At step S225, the variable j is set to "0". At step S226, the variable DIFF_TASK is set to "3", and the procedure returns.

If the determination at step S222 is denied, the procedure is returned, and the DIFF_TASK2 process is again carried out at the next timer interruption. If the determination at step S221 is affirmed, the procedure advances to step S227 at which the variable j is set to "0". At step S228, the variable DIFF_TASK is set to "4", and the procedure returns. That is, if the determination at step S221 is affirmed, the DIFF_TASK2 process and DIFF_TASK3 process are ceased, but a DIFF_TASK4 process which will be hereinbelow explained is carried out.

Figure 19:
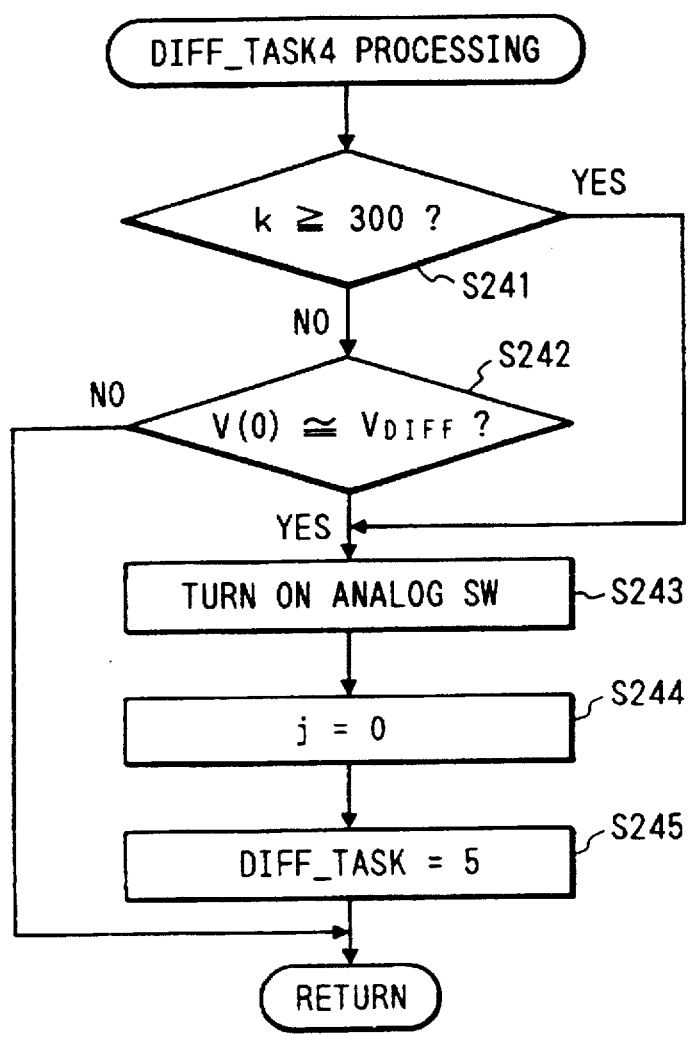
FIG. 19 is a flow-chart showing DIFF_TASK4 process.

Referring again FIG. 19, if the determination at step S155 is denied, the procedure advances to step S157 at which whether the variable DIFF_TASK is "3" or not is determined, and if the determination is affirmed, the procedure advances to step S158 at which the DIFF_TASK3 process shown in FIG. 19 is carried out, and the procedure returns. In this DIFF_TASK3 process, the detected zero angular velocity value is calculated. It is noted that the DIFF_TASK3 process is carried out during the period from t4 to t5 in FIG. 7F.

Figure 18:
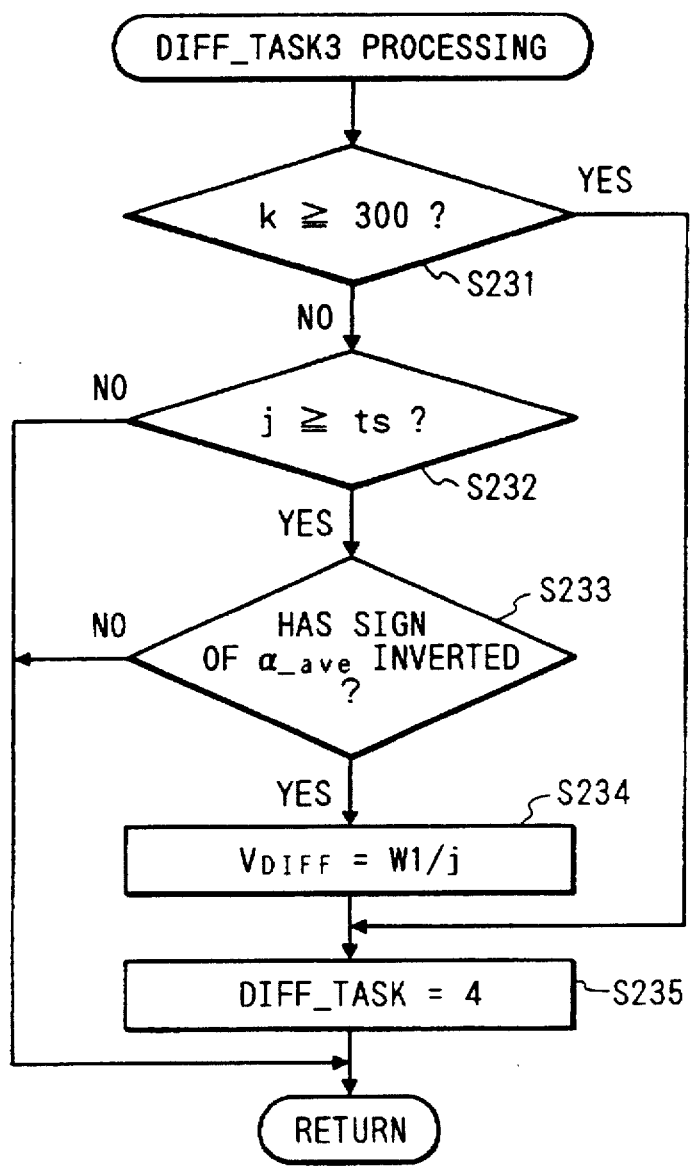
FIG. 18 is a flow-chart showing DIFF_TASK3 process.

At step S231 in FIG. 18, whether the variable k is greater than 300 or not is determined, similar to step S221. If the determination is denied, the procedure is advanced to step S232 at which whether variable j is greater than ts is determined. The reason why the determination at step S232 is carried out, is such that the risk in which the sign of the averaged angular acceleration value α_ave is changed just after the time t4 as shown in FIG. 7F possibly occur since the averaged angular acceleration value α_ave contains an error. Thus, with the provision of the determination at step S232, the detection of the change of the sign cannot be carried out during the period from t4 to t5.

If the determination at step S232 is affirmed, the procedure is advanced to step S233 at which whether the sign of the averaged angular acceleration value αave is changed is determined. If the determination is affirmed, the procedure advances to step S234 at which the detected zero angular velocity value $V_{DIFF}$ in the differentiating mode is calculated by use of the following formula (15):

$$V_{DIFF}=W1/j \qquad (15)$$

At step S235, the variable DIFF_TASK is set to "4", and the procedure is returned. Further, if both determinations at step S232 and S233 are denied, the procedure is returned. Meanwhile, if the determination at step S231 is affirmed, the procedure is advanced to step S235. That is, in this case, the DIFF_TASK3 process is ceased.

Referring again to FIGS. 14A and 14B, if the determination at step S157 is denied, the procedure is advanced to step S159 at which whether the variable DIFF_TASK is "4" or not is determined, and if the determination is affirmed, the procedure advances to step S160 at which the DIFF_TASK4 process shown in FIG. 19 is carried out, and the procedure returns. In this DIFF_TASK4 process, the timing with which the analog switch 1 is again turned on is located, and at this timing the analog switch 1 is turned on. It is noted that the DIFF_TASK4 process is carried out during the period from t5 to t6 in FIG. 7F.

At step S241 in FIG. 19, whether the variable k is larger than 300 or not is determined. If the determination is denied, the procedure advances to step S242 at which whether the present A/D converted output value substitute in the variable V(0) is equal to $V_{DIFF}$ calculated at step S234 or not is determined. That is, at step S244, the timing with which the A/D converted output value is equal to the detected zero angular velocity value $V_{DIFF}$ is located.

If the determination at step S242 is denied, the procedure is returned, but if it is affirmed, the procedure is advanced to step S243 at which the analog switch 1 is turned on. The reason why the analog switch 1 is turned in such a case that the determination at step S243 is affirmed, is such that the detected zero angular velocity value $V_{DIFF}$ is ideal to have zero volts. Thus, the analog switch 1 is turned on at the time when the A/D converted output value V(0) becomes equal to $V_{DIFF}$, and accordingly, the A/D converted output value V(0) approaches zero volts at this time. Thereby it is possible to reduce the offset value.

In the circuit shown in FIG. 6, it is considered that the output of the operational amplifier OP has to become zero volts when the analog switch SW1 is turned on since the both input terminals of the operational amplifier are set at 0 volts. However, it does not become zero volts due to an evenness of the circuit or the like. Thus, the A/D converted output V at this time contains an offset value Δω2.

At step S244, the variable j is set to "0", and at step S245, the variable DIFF_TASK is set to "5". Then the procedure returns.

Figure 20:
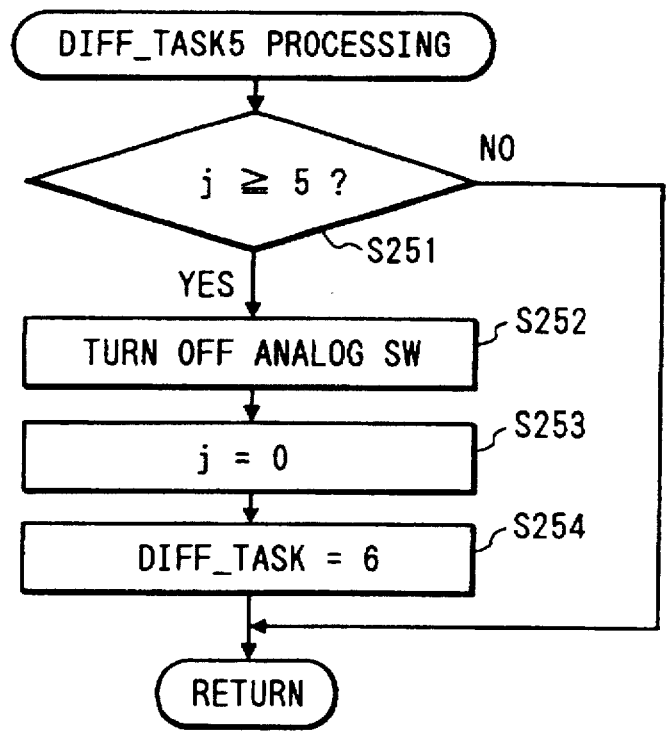
FIG. 20 is a flow-chart showing DIFF_TASK5 process.

Referring again to FIGS. 14A and 14B, if the determination at step S159 is denied, the procedure is advanced to step S161 at which whether the variable DIFF_TASK is "5" or not is determined, and if the determination is affirmed, the procedure advances to step S162 at which a DIFF_TASK5 process shown in FIG. 20 is carried out before the procedure returns. During the DIFF_TASK5 process, the timing with which the analog switch SW1 is tuned off is located, and at the timing the analog switch SW1 is turned off. It is noted that the DIFF_TASK5 process is carried out during the period from t6 to t7 in FIG. 7F.

At step S251 in FIG. 20, whether the variable j is larger than "5" is determined, and if the determination is denied, the procedure returns, but if the determination is affirmed, the procedure advances to step S252 at which the analog switch SW1 is turned off. That is, after the analog switch SW1 is turned on during the DIFF_TASK5 process, if the timer interruption is carried out by five times, the determination is affirmed, and accordingly, the procedure advances to step S252.

At step S252, the analog switch SW1 is turned off, and at step S253, the variable j is set to "0". Then at step S254, the variable DIFF_TASK is set to "6", and the procedure is returned. The timing with which the analog switch SW1 is turned off, is at time t7 in FIG. 7F.

Figure 21:
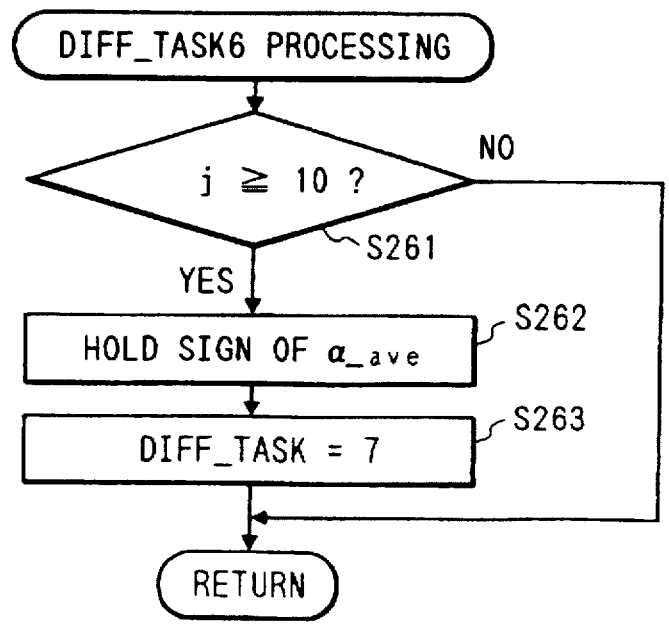
FIG. 21 is a flow-chart showing DIFF_TASK6 process.

Referring again to FIGS. 14A and 14B, if the determination at step S161 is denied, the procedure is advanced to step S163 at which whether the variable DIFF_TASK is "6" or not is determined, and if the determination is affirmed, the procedure is advanced to step S164 at which a DIFF_TASK6 process shown in FIG. 21 is carried out before the procedure is returned. During the DIFF_TASK6 process, the sign of the averaged angular acceleration value α_ave is detected.

At step S261, whether the variable j is greater than "10" or not is determined, and if the determination is denied, the procedure returns. The reason why the determination at step S261 is carried out, is such that the detection of the sign of the angular acceleration is carried out after a predetermined time elapses from the time when the analog switch SW1 is changed over since noise easily enters into the A/D converted output just after the analog switch SW1 is changed over.

At step S262, the sign of the averaged angular acceleration value α_ave is detected, and the variable DIFF_TASK is set to "7" before the procedure returns.

Figure 22:
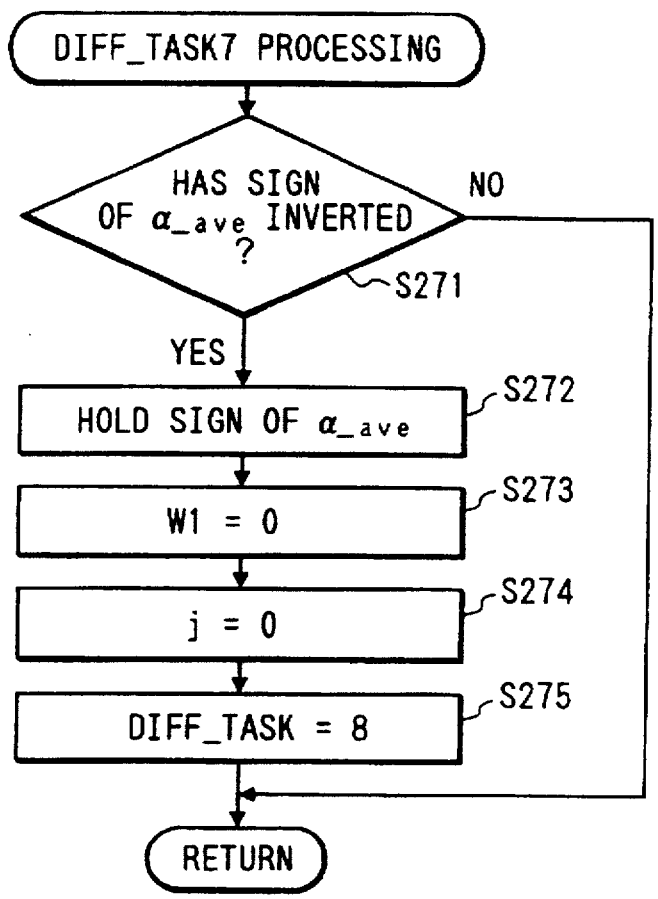
FIG. 22 is a flow-chart showing DIFF_TASK7 process.

Referring again to FIGS. 14A and 14B, if the determination at step S163 is denied, the procedure advances to step S165 at which whether the variable DIFF_TASK is "7" is determined, and if the determination is affirmed, the procedure advances to step S166 at which a DIFF_TASK7 process shown in FIG. 22 is carried out before the procedure returns. During the DIFF_TASK7 process, the timing with which the sign of the averaged angular acceleration value α_ave is changed, is located. It is noted that the DIFF_TASK7 process is carried out during the period from t7 to t8 in FIG. 7F.

At step S271 in FIG. 22, whether the sign of the averaged angular acceleration value α_ave is changed is determined. If the determination is denied, the procedure returns. If the determination at step S271 is affirmed, the procedure advances to step S272 at which the sign of the averaged angular acceleration value α_ave is detected. It is noted that the time when the determination is affirmed is at the time t8 in FIG. 7F.

At step S273, the added-up value W1 in the differentiating mode is set to "0", and then, at step 274, the variable j is set to "0". At step S275, the variable DIFF_TASK is set to "8", and the procedure returns.

Figure 23:
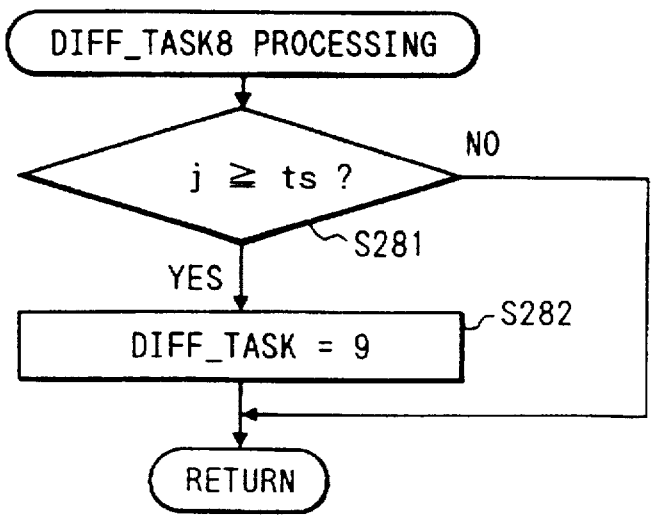
FIG. 23 is a flow-chart showing DIFF_TASK8 process.

Referring again to FIGS. 14A and 14B, if the determination at step S165 is denied, the procedure advances to step S167 at which whether the variable DIFF_TASK is "8" is determined, and if the determination is affirmed the procedure advances to step S170 at which a DIFF_TASK8 process shown in FIG. 23 is carried out before the procedure returns. During this DIFF_TASK7 process, such a condition that time elapses from the time t8 to the time ts in FIG. 23 is detected.

At step S281 in FIG. 23, whether the variable j is greater than ts is determined. The reason why this determination is carried out is similar to that at step S232 in FIG. 18.

If the determination at step S281 is denied, the procedure is returned, but if the determination is affirmed, the procedure advances to step S282 at which the variable DIFF_TASK is set to "9" before the procedure returns.

Figure 24:
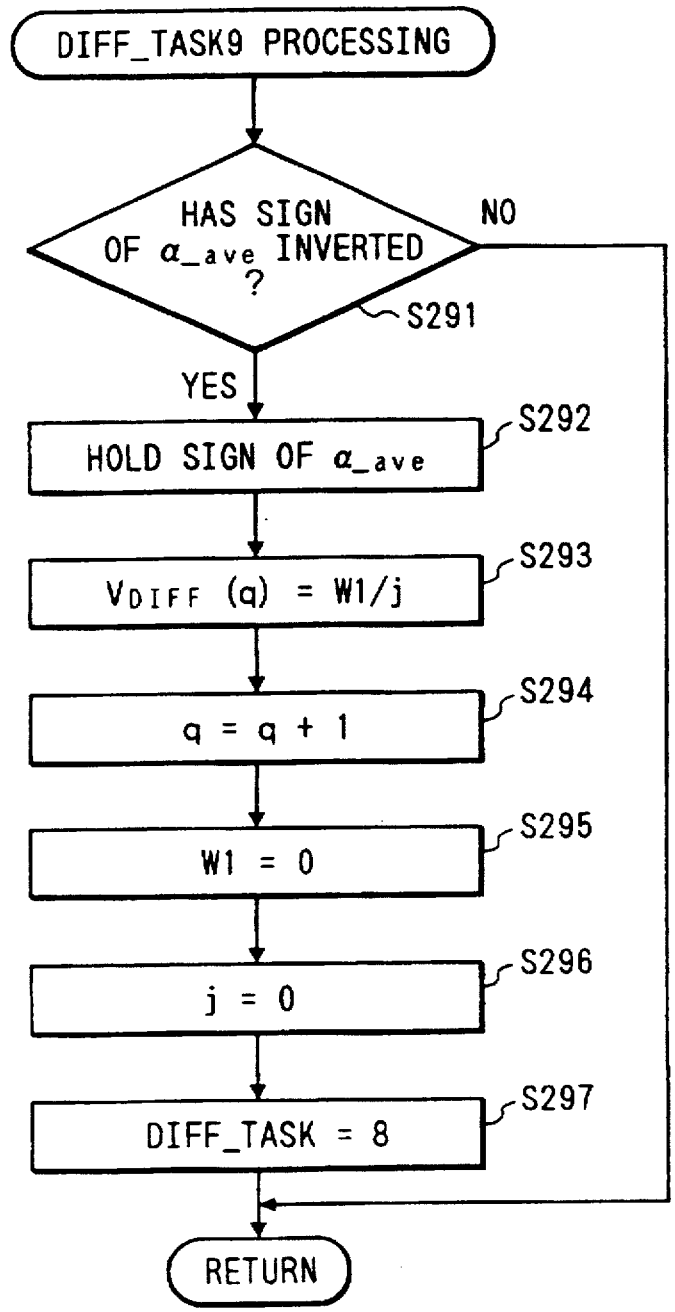
FIG. 24 is a flow-chart showing DIFF_TASK9 process.

Referring again to FIGS. 14A and 14B, if the determination at step S167 is denied, the procedure advances to step S169 at which whether the variable DIFF_TASK is "9" is determined, and if the determination is affirmed, the procedure advances to step S170 at which a DIFF_TASK9 process shown in FIG. 24 is carried out before the procedure returns. During this DIFF_TASK9 process, the detection of the timing with which the sign of the averaged angular acceleration value α_ave is changed, the calculation of the detected zero angular velocity value in the differentiating mode and the measurement for the frequency of the calculation of the detected zero angular velocity value and the like are carried out.

At step S291 in FIG. 24, whether the sign of the averaged angular acceleration α_ave is changed is determined, and if the determination is denied, the procedure returns, but if the determination is affirmed, the procedure advances to step S292 at which the sign of the averaged angular acceleration value α_ave is detected. At step S293, the detected zero angular velocity value $V_{DIFF}$(q) in the differentiating mode is calculated, where the $V_{DIFF}$(q) is a detected zero angular velocity value obtained at q-th time.

$$V_{DIFF}(q)=W1/j \qquad (16)$$

In the formula (16), the variable W1 is the added up A/D output value which is calculated at step S67 in FIG. 10. With the use of this formula (16), the averaged value of the added-up A/D output value having been calculated from the time when the sign of the averaged angular acceleration value α_ave is changed to the time when the same is changed at the next time, is obtained, and so doing, the detected zero angular velocity value $V_{DIFF}$ is obtained in this interval.

At step S294, the variable q for measuring the frequency of the calculation of the detected zero angular velocity value $V_{DIFF}$ is added with "1" At step S295, the added-up A/D output value W1 is set to "0", and at step S296, the variable j is set to "0". Then, at step S297, the variable DIFF_TASK is set to "8", and the procedure returns.

Thereafter, the DIFF_TASK8 process and the DIFF_TASK9 process are repeatedly carried out, and a new detected zero angular velocity $V_{DIFF}$ is calculated each time when the sign of the averaged angular acceleration value α_ave is changed.

Thus, in the differentiating mode zero angular velocity detection task process, the voltage level corresponding to the zero angular velocity is repeatedly calculated after the offset value is reduced, and accordingly, the voltage level corresponding to the zero angular velocity can be obtained without being affected by noise.

Figure 26:
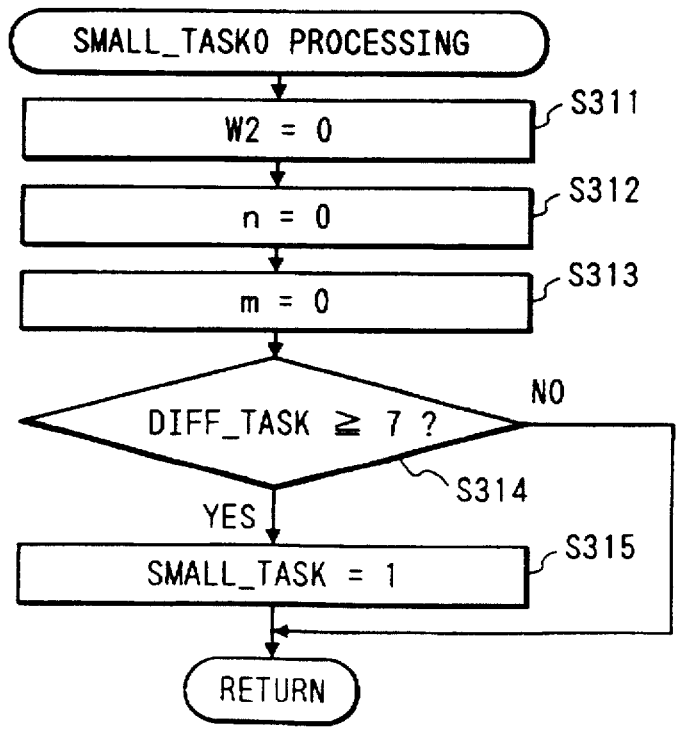
FIG. 26 is a flow-chart showing SMALL_TASK0 process.

FIG. 25 is a flow-chart which shows the details of the small interval mode zero angular velocity detection task process which is carried out at step S70 in FIG. 6. At step S301 in FIG. 25, whether a variable SMALL_TASK is "0" is determined, and if the determination is affirmed, the procedure advances to step S302 at which a SMALL_TASK0 process shown in FIG. 26 is carried out. During this SMALL_TASK0 process, several variables are initialized.

At step S311, the added-up output value W2 in the small interval mode is set to "0". At step S312, the frequency n of the added A/D output value W2 in the small interval mode is set to "0". In the small interval mode zero angular velocity detection task process, the frequency of the adding-up of the A/D converted outputs is measured by the variable n, and an averaged value of the added-up A/D output value is calculated each time when the variable n comes to a predetermined value.

At step S313, a variable m for measuring the frequency of the zero angular velocity detection in the small interval mode is set to "0". At step S314, whether the variable DIFF_TASK is larger than "7" is determined. Thus, even in the case of the zero angular velocity detection in the small interval mode, whether the variable DIFF_TASK used in the differentiating mode zero angular velocity detection task process is greater than "7" is detected, and accordingly, whether the time 7 at which the offset value is reduced, is reached is determined.

If the determination at step S314 is affirmed, the procedure advances to step S315, the variable SMALL_TASK is set to "1", and then the procedure returns. Meanwhile, the determination at step S314 is denied, the procedure returns.

Figure 27:
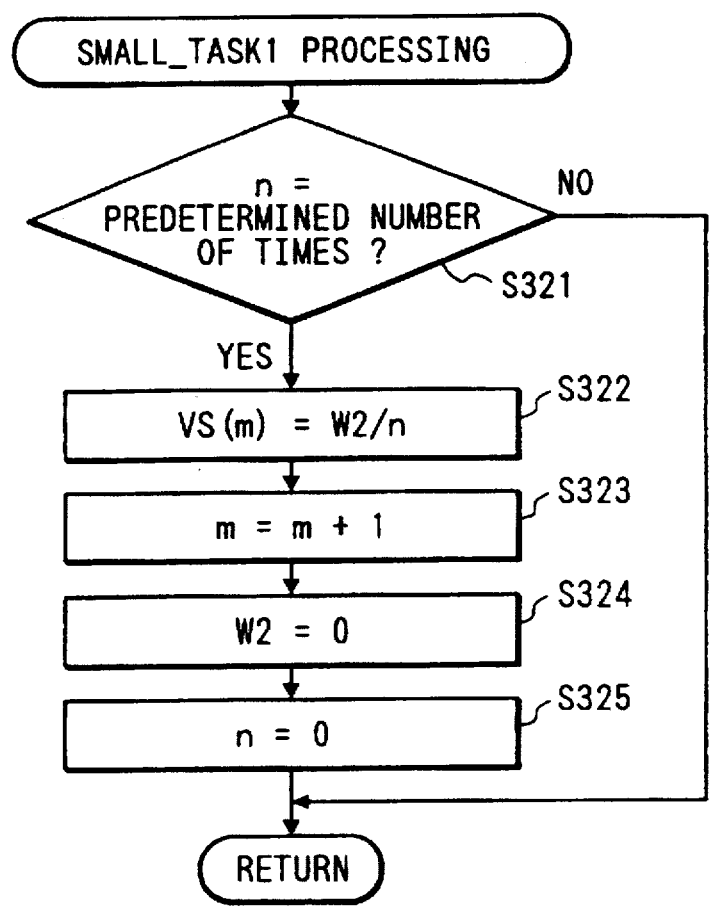
FIG. 27 is a flow-chart showing SMALL_TASK1 process.

Referring again to FIG. 25, if the determination at step S301 is denied, the procedure advances to step S303 at which whether the variable SMALL_TASK is "1" is determined. If the determination is affirmed, the procedure advances to step S304 at which a SMALL_TASK1 process shown in FIG. 27 is carried out, and then the procedure returns. Meanwhile, the determination at step S303 is denied, the procedure is returned.

At step S321 in FIG. 27, whether the variable n is a predetermined frequency is determined, and if the determination is denied, the procedure returns, but if the determination is affirmed, the procedure advances to step S322 at which the detected zero angular velocity value in the small interval mode is calculated with the use of the following formula:

$$V_s(m)=W2/j \qquad (17)$$

At step S27, "1" is added to the variable m for measuring the frequency of the zero angular velocity detection in the small interval mode. At step S324, the added-up first A/D output value W2 in the small interval mode is set to "0". At step S325, the frequency n of the summation of the added-up A/D output value in the small interval mode is set to "0". Thereafter, the CPU 14A carries out the SMALL_TASK1 process each time when the timer interruption is effected, and accordingly, the zero angular velocity detection is carried out for every small interval.

Thus, during the small interval mode zero angular velocity detection task process, the zero angular velocity detection is carried out at every interval after the offset value is reduced, and accordingly, the zero angular velocity detection can be easily carried out in comparison with the differentiating mode as mentioned above.

FIG. 28 is a flow-chart which shows the details of the differentiating mode data setting process carried out at step S72 in FIG. 6. At step S401 in FIG. 28, the detected zero angular velocity $V_{DIFF}$(i) (i=0, 1, ... q−1) in the differentiating mode is added in the variables $V_0$(i).

At step S402, the frequency q of the zero angular velocity detection in the differentiating mode is substituted into a variable r, and the procedure is returned.

FIG. 29 is a flow-chart which shows the details of the small interval mode data setting process carried out at step S73 in FIG. 11. At step S411 in FIG. 29, the detected zero angular velocity value $V_s$(i) (i=0,1, ... q−1) is substituted into the variable $V_s$(i).

At step S412, the frequency m of the zero angular velocity detection in the small interval mode is substituted into the variable r, and the procedure is returned.

FIGS. 30 to 32 are flow-charts which show details of the zero angular velocity detecting precision improving process. Three kinds of the zero angular velocity detecting precision are present as shown in FIGS. 30 to 32, and accordingly, the CPU 14A performs either one of them. Which one of them is carried out is designated by the cameraman through a switch or the like which is not shown.

At step S421 in FIG. 30, a number L of averaged values which are latest calculated, among a number r of detected zero angular velocity values, as shown in the following formula (18):

$$V_0 = \left\{ \sum_{i=r-L}^{r-1} V_o(i) \right\} / L \qquad (18)$$

Thus, since the number L of the latest detected zero angular velocity values are used without using all detected zero angular velocity values, the detected zero angular velocity values can be rapidly obtained. Further, since the averaged value is obtained from the latest calculated values, the zero angular velocity detection with a high degree of precision can be carried out.

If the total number r of the detected zero angular velocity value is less that the number L, the averaged value can be obtained by using all the number r of the detected zero angular velocity values. Further, if r> L, the number r of the detected zero angular velocity values can be all used for obtaining the averaged value.

At step S431 in FIG. 31, a process similar to that at step S421 in FIG. 30 is carried out. At step S432, a predetermined initial voltage width is substituted into a voltage range (which will be hereinbelow denoted as "reject voltage") $\pm \Delta V$ for the detected zero angular velocity values $V_0$. In this stage, for example, the initial voltage range is made to be sufficiently small.

At step S433, a variable i is set to |r−L|, and a variable p and the added-up zero angular velocity value $W_0$ are set to "0". The variable i is used for locating the detected zero angular velocity values $V_0(i)$ which have been obtained by the process shown in FIGS. 28 and 29, and the variable p is used for measuring the number of data included in the reject width.

At step S433, whether the absolute value of a difference between the variable $V_0(i)$ and the value $V_0$ calculated at step S431 is smaller than $\Delta V$ is determined. At this step S434, whether the variable $V_0$ falls into the range of the reject width $\pm \Delta V$ is determined.

If the determination at step S434 is affirmed, the procedure advances to step S435, the variable $V_0(i)$ is added to the variable $W_0$ as shown in the following formula:

$$W_0 = W_0 + V_0(i) \tag{19}$$

Figure 33A:
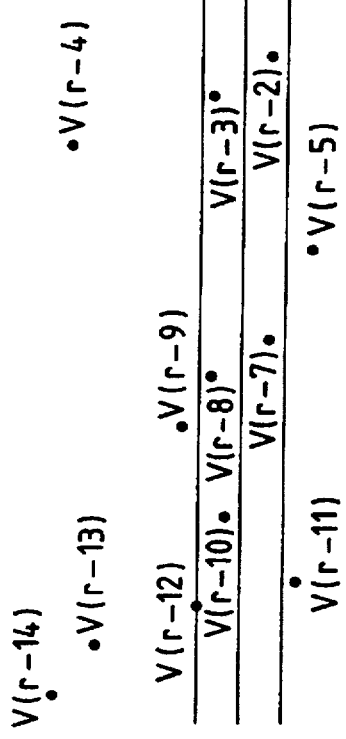
FIGS. 33A and 33B are views showing reject widths in FIG. 31, respectively.

In an example shown in FIG. 33A, $V_0(i)$ within the range of the reject width $\pm \Delta V$ are successively added.

At step S436, the variable p is added with "1". At step S437, whether the variable i is equal to the "r−L" or not is determined, and if the determination is denied, the procedure advances to step S438 as which the variable i is added with "1", and the procedure returns to step S433.

If the determination at step S437 is affirmed, the procedure advances to step S439 at which whether the number P of data in the reject width is greater than a predetermined value is determined. If the determination is denied, the procedure advances to step S440 as which the reject width $\pm \Delta V$ is wider than a predetermined range or not is determined, and if the determination is denied, the procedure advances to step S441.

At step S441, as shown in the following formula (20), a predetermined value is added to $\Delta V$ so as to widen the reject width, and the procedure returns to step S433.

$$\Delta V = \Delta V + \text{predetermined value} \tag{20}$$

Figure 33B:
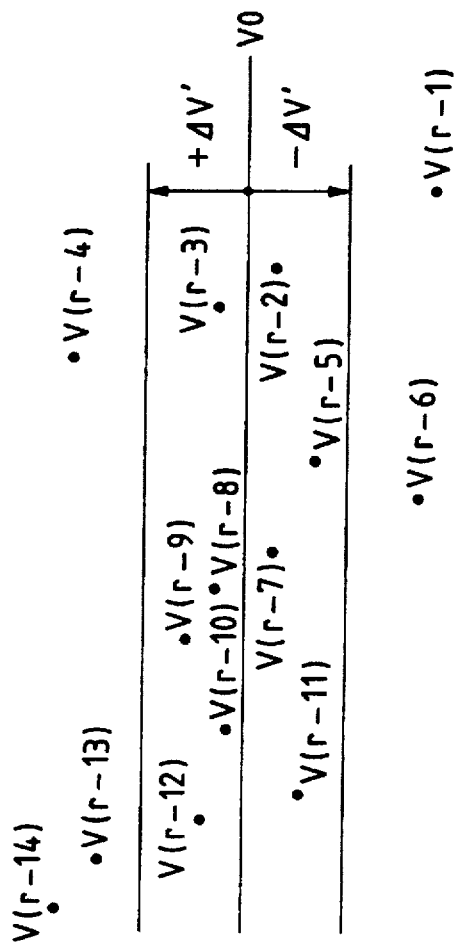

In the case of carrying out the process at 441, the value of the variable p is smaller than a predetermined value, and accordingly, the reject width is widened at step S441 so as to increase the number of data included in the range of the reject width. FIG. 33(b) shows such an example that the reject width is widened from $\pm \Delta V$ to $\pm \Delta V'$.

Meanwhile, the determination at step S441 or S440 is affirmed, the procedure advances to step S442 at which the averaged value $V_0$ of data within the reject width $\pm \Delta V$ is calculated, and the procedure returns.

$$V_0 = W_0/P \tag{21}$$

Thus, in the zero angular velocity detecting precision improving process, the detected zero angular velocity values $V_0(i)$ included in the predetermined range are extracted from the averaged values which have been obtained among the number L of latest detected zero angular velocity values, and accordingly, errors in the detected zero angular velocity values can be precisely detected in comparison with the case shown in FIG. 30.

In contrast to the process shown in FIG. 31, in the process of FIG. 32, the reject width is gradually narrowed so as to restrict the data.

Figure 34A:
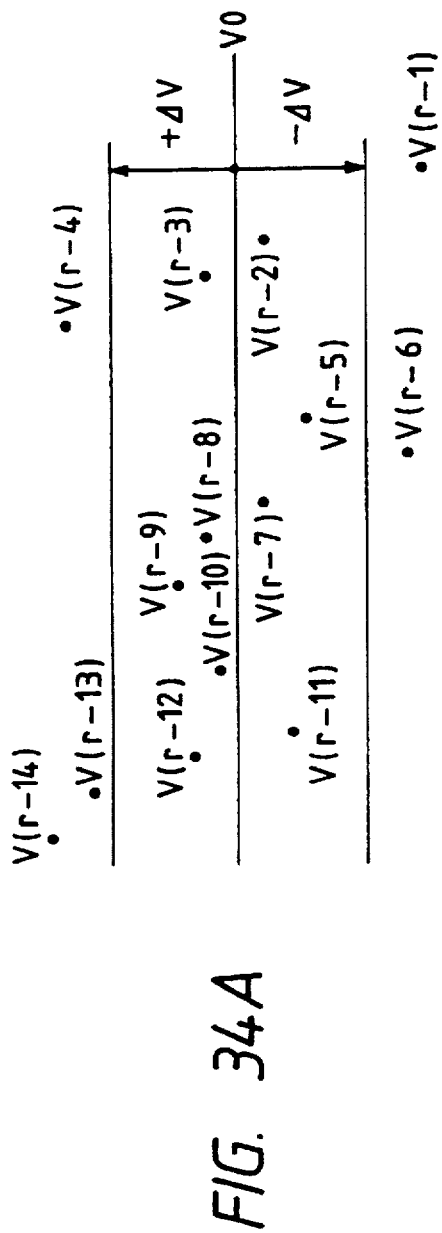
FIGS. 34A and 34B are views showing reject widths in FIG. 32, respectively.

At step S451 in FIG. 32, a process similar to that at step S431 in FIG. 31 is carried out. At step S452, the reject width $\pm \Delta V$ is initially set. For example, in the case of FIG. 34A, the reject width is determined as indicated by the solid line. From steps S451 to S458, a process similar to that from step S433 to S438 is carried out.

Figure 34B:
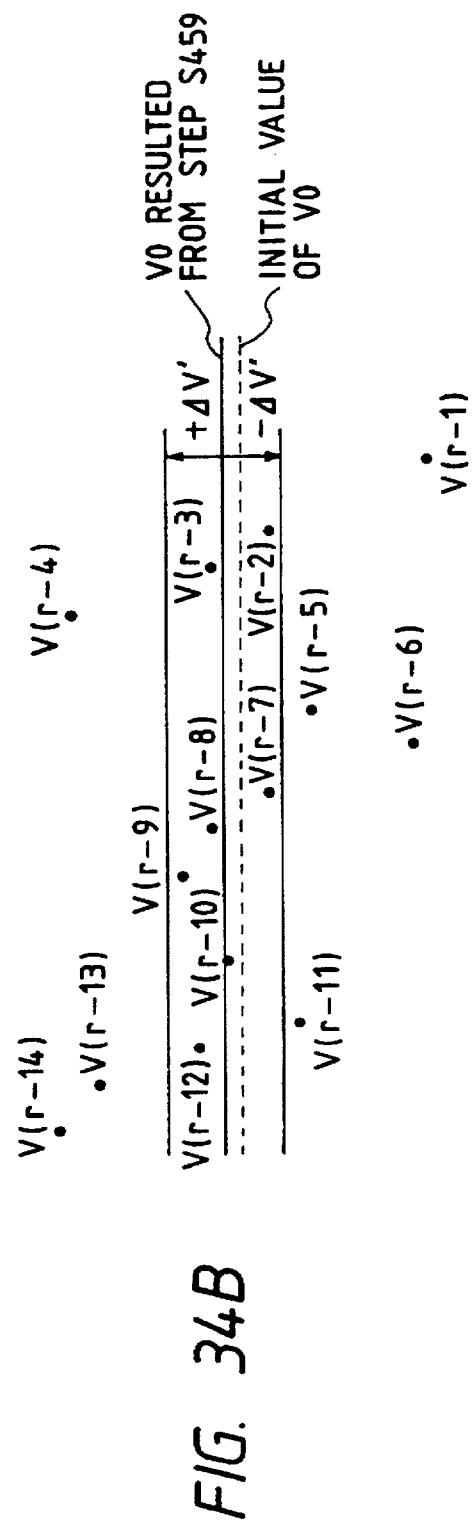

At step S459, similar to step S432, the averaged value of the detected zero angular velocity values within the reject width is obtained. At step S460, whether the number p of data within the reject width is smaller than a predetermined number or not is determined. If the determination is denied, the procedure advances to step S461 at which whether the reject width $\pm \Delta V$ is in a predetermined range is determined. If the determination is denied, the procedure advances to step S461 at which a predetermined value is delivered from $\Delta V$ so as to narrow the reject width, and then the procedure returns to step S453. Accordingly, as shown in FIG. 34B, the number of data included within the reject width indicated by the solid line is decreased. It is noted that FIG. 34B shows an example in which the reject width is narrowed from $\pm \Delta V$ to $\pm \Delta V'$, and in this figure, the averaged values calculated at step S451 are indicated by the dotted line, and the averaged values calculated at step S459 are indicated by the bold line.

FIG. 35 is a flow-chart which shows the details of the maximum angular velocity value calculation process carried out at step S77.

At step S35 in FIG. 35, whether the absolute value of the angular velocity $\omega$ obtained at step S76 in FIG. 11 is greater than the previously obtained maximum angular velocity value is determined. If the determination is denied, the procedure returns. If the determination is affirmed, the procedure advances to step S472.

At step S472, the maximum angular velocity value is set to the angular velocity $\omega$, and the procedure returns.

The above-mentioned reject width $\pm \Delta V$ may be fixed, or may be optionally widened or narrowed in view of a number of data included in the reject range. In general, how most precise zero angular velocity detection can be made by a number included in the reject width can be empirically determined.

During the timer interruption process shown in FIGS. 10 to 13, the averaged value is obtained each time when eight angular velocities are calculated. However, the number of the angular velocities from which the averaged value is obtained should not be limited to this embodiment.

Although the LEDs which can vary their in flashing speed in accordance with slight motion are provided in the display circuit 15A shown in FIG. 6, the slight motion may be indicated by, for example, a numerical value or a graph with the use of a liquid crystal display unit or the like.

Although above-mentioned CPU 14A calculates simply the averaged value, or averages data under weighing, the method of averaging should be limited to the second embodiment.

In the above-mentioned first and second embodiments, although the angular velocity is caused by slight motion, the means for detecting should not be limited to detecting an angular velocity. For example, the slight motion may be obtained by a detecting a dynamic value such as an acceleration, an angular acceleration, an angle or a position.

Figure 1:
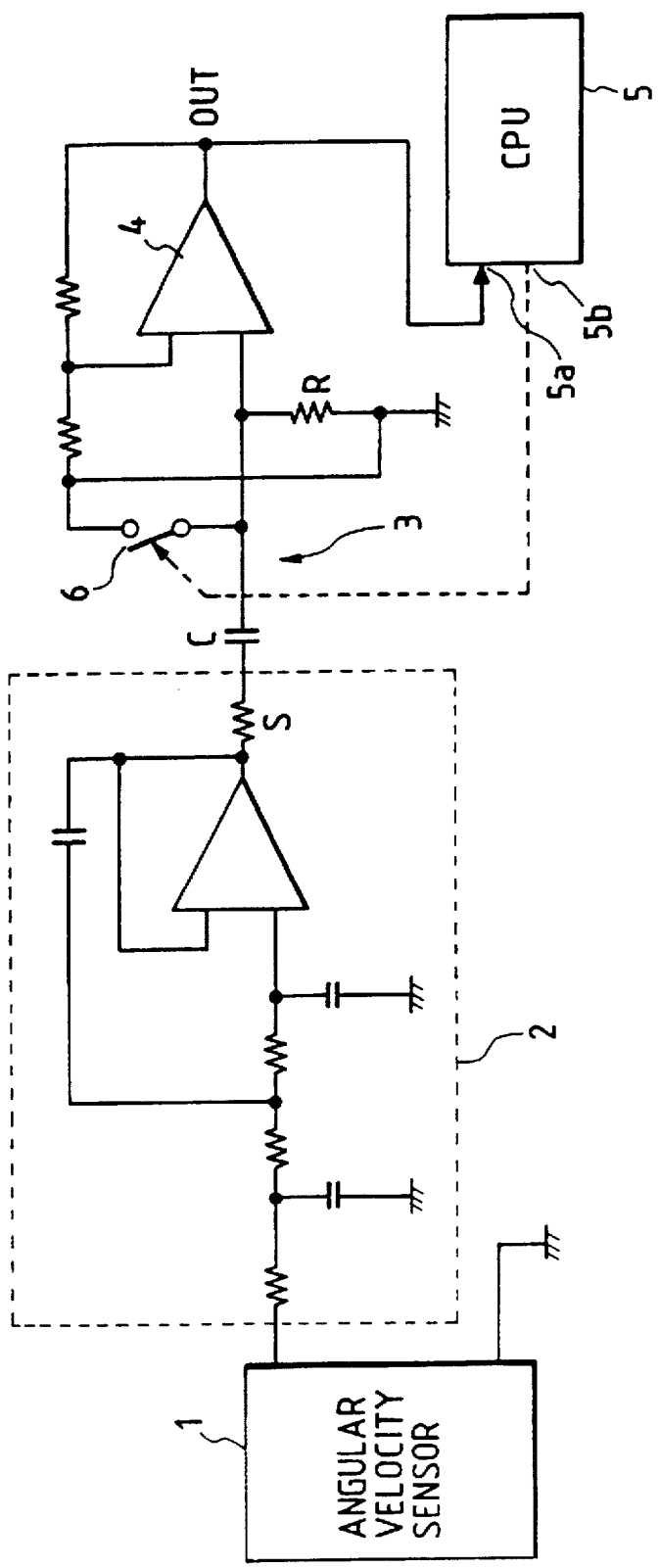
FIG. 1 is a circuit block diagram illustrating a basic structure of a slight motion detecting device according to the present invention as well as a first embodiment of the slight motion detecting device according to the present invention.

In any event, if a sensor for detecting each of the dynamic value, is used, instead of the angular velocity sensor shown in FIG. 1 and 6, the slight motion can be detected, similar to the above-mentioned embodiment.

Further, although in the above-mentioned embodiments, an example in which the slight motion detecting device is applied to a still camera, has been explained, the slight motion detecting device according to the present invention can be applied to any other equipment other than the still camera, including a video camera.

Further, although, in the above-mentioned embodiment, a variation in angular velocity caused by slight motion is converted into a voltage from which the slight motion is calculated, it can be converted into a current from which the slight motion is then calculated.

What is claimed is:

1. A slight motion detecting device comprising:

a slight motion detecting unit to detect a slight motion;

an extreme value detecting unit to detect extreme values of outputs from said slight motion detecting unit;

a prezero level detecting unit to detect a prezero level corresponding to an output from said slight motion detecting unit in the case of no slight motion, in accordance with an output from said extreme value detecting unit; and a slight motion output correcting unit to correct an output from said slight motion detecting unit in accordance with a signal from said prezero level detecting unit.

2. A slight motion detecting device comprising:

a slight motion detecting unit to detect a slight motion;

an amplifying unit to amplify a signal from said slight motion detecting unit;

an extreme value detecting unit to detect extreme values of outputs from said amplifying unit;

a prezero level detecting unit to detect a prezero level corresponding to an output from said amplifying unit in the case of no slight motion, in accordance with an output from said extreme value detecting unit; and a slight motion output correcting unit to correct an output from said amplifying unit in accordance with a signal from said prezero level detecting unit.

3. A slight motion detecting device comprising:

a slight motion detecting unit to detect a slight motion;

an extreme value detecting unit to detect extreme values of outputs from said slight motion detecting unit;

a prezero level detecting unit to detect a prezero level corresponding to an output from said slight motion detecting unit in the case of no slight motion, in accordance with an output from said extreme value detecting unit;

a moving average calculating unit to move an average of outputs from said prezero level detecting means; and a slight motion output correcting unit to correct an output from said slight motion detecting unit in accordance with a signals from said moving average calculating unit.

4. A slight motion detecting device comprising:

a slight motion output unit to output a detection signals corresponding to slight motion;

a differentiating unit to differentiate said detection signal and to output a differentiated signal;

a sign change detecting unit to detect a change of the sign of said differentiated signal;

a reference level calculating unit to calculate a reference level for said detection signal in accordance with said detection signal until the sign of said differentiated signal is changed from one to the other with the change of said sign being detected by said sign change detecting unit; and a slight motion amount correcting unit to correct said slight motion in accordance with said reference level.

5. A device as set forth in claim 4, wherein said sign change detecting unit includes a stopping unit to stop detection of said sign change for a predetermined time from the time when said sign change is detected.

6. A device as set forth in claim 4, further comprising:

a display unit to change a display configuration in accordance with a slight motion detected by said slight motion amount correcting unit; and a reference level number measuring unit to measure a number of said reference levels repeatedly calculated by said reference level calculating unit, wherein said display unit stops its display operation when a number calculated by said reference level number measuring unit is less than a predetermined number.

7. A device as set forth in claim 4, further comprising:

a display unit to change the display configuration in accordance with a slight motion detected by said slight motion amount correcting unit; and a reference level number measuring unit to measure a number of said reference levels repeatedly calculated by said reference level calculating unit, wherein said display unit displays a configuration different from a display configuration in accordance with the degree of slight motion is a number calculated by said reference level number measuring unit is less than a predetermined number.

8. A device as set forth in claim 4, wherein said slight motion output unit outputs an angular velocity signal in accordance witch said slight motion.

9. A slight motion detecting device comprising:

a slight motion output unit to output a detection signal corresponding to slight motion;

a differentiating unit to differentiate said detection signal and to output a differentiated signal;

an averaging unit to average said differentiated signal and to output an averaged signal;

a sign change detecting unit to detect a change of the sign of said averaged signal;

a reference level calculating unit to correct a reference level for said detection signal in accordance with said detection signal until the sign of said averaged signal is changed from one to the other with the change of said sign being detected by said sign change detecting unit; and a slight motion correcting unit to correct said slight motion in accordance with said reference level.

10. A slight motion detecting device comprising:

a slight motion output unit to output a detection signal corresponding to slight motion;

an averaging unit to average said detection signal and to output an averaged signal;

a differentiating unit to differentiate said averaged signal and to output a differentiated signal;

a sign change detecting unit to detect a change of the sign of said differentiated signal;

a reference level calculating unit to calculate a reference level for said detection signal in accordance with said detection signal until the sign of said differentiated signal is changed from one to the other with the change of said sign being detected by said sign change detecting unit; and a slight motion correcting unit to correct said slight motion in accordance with said reference level.

11. A slight motion detecting device comprising:

a slight motion output unit to output a detection signal corresponding to slight motion;

a differentiating to differentiate said detection signal and to output a differentiated signal;

a sign change detecting unit to detect a change of the sign of said differentiated signal;

a reference level calculating unit to calculate a reference level for said detection signal in accordance with said detection signal until the sign of said differentiated signal is changed from one to the other with the change of said sign being detected by said sign change detecting unit; and a reference level detecting precision improving unit to average the repeatedly calculated reference levels which are calculated by said reference level calculating unit; and a slight motion correcting unit to correct said slight motion in accordance with an output from said reference level detecting precision improving unit.

12. A device as set forth in claim 11, wherein said reference level detecting precision improving unit averages a predetermined number of those of the repeatedly calculated reference levels, which have been lastly calculated, or all of the repeatedly calculated reference levels if all said repeatedly calculated reference levels have a number less than said predetermined number.

13. A device as set forth in claim 11, further comprising a reference level extracting unit to extract those of said repeatedly calculated reference levels which fall in a first reference range, wherein said reference level detecting precision improving unit averages said reference levels extracted by said reference level extracting unit.

14. A device as set forth in claim 13, further comprising a measuring unit to measure a number of reference levels extracted by said reference level extracting unit, wherein said reference level extracting unit extracts the reference levels which fall in a second reference range which is broader than the first reference range if said measured number is less than a predetermined number.

15. A device as set forth in claim 13, further comprising a measuring means for measuring a number of the reference levels extracted by said reference level extracting unit, wherein said reference levels extracting unit extracts the reference level which falls in a second reference range narrower than the first reference range if said measured number is greater than a predetermined number.

16. A slight motion detecting device comprising:

a slight motion output unit to output a detection signal corresponding to slight motion;

an amplifying unit to amplify said detection signal;

a differentiating unit to differentiate an output from said amplifying unit and to output a differentiated signal;

a sign change detecting unit to detect a change of the sign of said differentiated signal;

a reference level calculating unit to calculate a reference level for said amplified detection signal in accordance with said amplified detection signal until the sign of said differentiated signal is changed from one to the other with the change of said sign being detected by said sign change detecting unit; and a slight motion correcting unit to correct said amplified detection signal in accordance with said reference level.

17. A device as set forth in claim 16, wherein said amplifying unit further comprises a change-over unit to change whether a detection signal delivered from said slight motion output unit is inputted or a predetermined level signal is inputted; and an offset control unit to carry out such a control that said change-over unit is changed over so as to input said predetermined level signal to said amplifying unit for a predetermined time when the signal level of said detection signal amplified by said amplifying unit, becomes substantially equal to said reference level calculated by said reference level calculated unit.

18. A device as set forth in claim 17, further comprising a time measuring unit to measure a time by which the signal level of said detection signal amplified by said amplifying unit becomes substantially equal to said reference level, wherein when the time measured by said time measuring unit exceeds a predetermined time, the control by said offset control means is stopped.

19. A device as set forth in claim 18, further comprising a forced offset control unit to change over said change-over unit so as to input a predetermined level signal to said amplifying unit by a predetermined time when the control by said offset control unit is stopped.

20. A slight motion detecting device comprising:

a slight motion output unit to output a detection signal in accordance with a slight motion;

an averaging unit to average said detection signal for every predetermined time;

a reference level calculating unit to repeatedly calculate reference levels of said detection signal corresponding to the case of no slight motion in accordance with said averaged detection signal;

a reference level detecting precision improving unit to average said repeatedly calculated reference levels which are calculated by said reference level calculating unit; and a slight motion correcting unit to correct said slight motion in accordance with an output from said reference level detecting precision improving unit.

21. A device as set forth in claim 20, wherein said reference level detecting precision improving unit averages a predetermined number of those of said repeatedly calculated reference levels, which are lastly calculated, or averages all said repeatedly calculated reference levels if a number of already calculated reference levels is less than said predetermined number.

22. A device as set forth in claim 20, further comprising a reference level extracting unit to extract those of said repeatedly calculated reference levels which fall in the first reference range, wherein said reference level detecting unit averages the reference levels extracted by said reference level extracting unit.

23. A device as set forth in claim 22, further comprising a measuring unit to measure a number of the reference levels extracted by said reference level extracting unit, wherein said reference level extracting unit extracts the reference levels in a second reference range which is broader than said first reference range if said measured number is less than a predetermined number.

24. A device as set forth in claim 22, further comprising a measuring unit to measure a number of the reference levels extracted by said reference level extracted by said reference level extracting unit, wherein said reference level extracting unit extracts the reference levels which fall in a second reference range narrower than said first reference range if said measured number is greater than a predetermined number.

25. A slight motion detecting device comprising:

a slight motion output unit to output a detection signal in accordance with a slight motion;

an amplifying unit to amplify said detection signal;

an averaging unit to average an output from said amplifying unit for every predetermined time;

a reference level calculating unit to repeatedly calculate reference levels of said amplified detection signal corresponding to the case of no slight motion in accordance with an output from said averaging unit;

a reference level detecting precision improving unit to average said repeatedly calculated reference levels which are calculated by said reference level calculating unit; and a slight motion correcting unit to correct said amplified detection signal in accordance with an output from said reference level detecting precision improving unit.

26. A device as set forth in claim 25, further comprising:

a change-over unit to change over whether said detection signal delivered from said slight motion output unit is inputted to said amplifying unit or a predetermined level signal is inputted thereto; and an offset control unit to control change-over of said change-over unit so as to input said predetermined level signal to said amplifying unit for a predetermined time when the signal level of said detection signal amplified by said amplifying unit becomes substantially equal to said reference level calculated by said reference level calculating unit.

27. A device as set forth in claim 26, further comprising a time measuring unit to measure a time by which the signal level of said detection signal amplified by said amplifying unit becomes substantially equal to said reference level, wherein when the time measured by said time measuring unit exceeds a predetermined time, the control by said offset control unit is stopped.

28. A device as set forth in claim 27, further comprising a forced offset control unit to change over said change-over unit so as to input said predetermined level signal to said amplifying unit by a predetermined time when the control by said offset control unit is stopped.

29. A slight motion detecting device comprising:

a slight motion output unit to output a detection signal in accordance with a slight motion;

an averaging unit to average said detection signal for every predetermined time;

a reference level calculating unit to calculate a reference level of said detection signal corresponding to the case of no slight motion in accordance with said averaged detection signal;

a slight motion correcting unit to correct said slight motion in accordance with said reference level;

a display unit to change a display configuration in accordance with a slight motion detected by said slight motion correcting unit; and a reference level number measuring unit to measure a number of said reference levels repeatedly calculated by said reference level calculating unit, wherein said display unit stops its display operation when a number calculated by said reference level number measuring means is less than a predetermined number.

30. A device as set forth in claim 29, wherein said slight motion output unit outputs an angular velocity signal in accordance with said slight motion.

31. A slight motion detecting device comprising:

a slight motion output unit to output a detection signal in accordance with a slight motion;

an averaging unit to average said detection signal for every predetermined time;

a reference level calculating unit to calculate a reference level of said detection signal corresponding to the case of no slight motion in accordance with said averaged detection signal;

a slight motion correcting unit to correct said slight motion in accordance with said reference level;

a display unit to change the display configuration in accordance with a slight motion detected by said slight motion correcting unit; and a reference level number measuring unit to measure a number of said reference levels repeatedly calculated by said reference level calculating unit, wherein said display unit displays a configuration different from a display configuration in accordance with said slight motion if a number calculated by said reference level number measuring unit is less than a predetermined number.

32. A slight motion detecting device comprising:

a slight motion output unit to deliver a detection signal in accordance with a slight motion;

an amplifying unit to amplify said detection signal;

a change-over unit to change over whether said detection signal is inputted to said amplifying unit or a zero level signal is inputted thereto;

an offset control unit to control change-over of said change-over unit so that an output from said amplifying unit when a reference level signal from said slight motion output unit, corresponding to the case of no slight motion, is inputted to said amplifying unit, becomes substantially equal to an output which is obtained from said amplifying unit when a zero level signal is inputted to said amplifying unit.

33. A device as set forth in claim 32, wherein said slight motion output unit outputs an angular velocity signal in accordance with said slight motion.

34. A slight motion detecting device comprising:

a slight motion output unit to output a detection signal in accordance with a slight motion;

a display unit to change a display configuration in accordance with a signal level of said detection signal; and a maximum or minimum level detecting unit to detect a maximum or minimum value of signal levels of said detection signal for every predetermined time, wherein said display unit changes the display configuration in accordance with said detected maximum or minimum value of said signal levels for every predetermined time.

35. A device as set forth in claim 34, wherein said slight motion output unit outputs an angular velocity signals in accordance with said slight motion.

* * * * *

UNITED STATES PATENT AND TRADEMARK OFFICE
CERTIFICATE OF CORRECTION

PATENT NO.  : 5,717,611
DATED       : February 10, 1998
INVENTOR(S) : Nobuhiko TERUI, et al.

It is certified that error appears in the above-identified patent and that said Letters Patent is hereby corrected as shown below:

Col. 29,    line 8, Claim 11, after "to" insert --a--;
Col. 29,    line 56, Claim 16, after "to" insert --a--.

Signed and Sealed this

Fourteenth Day of July, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,717,611

DATED : February 10, 1998

INVENTOR(S) : Nobuhiko TERUI, et al.

It is certified that error appears in the above-identified patent and that said Letters Patent is hereby corrected as shown below:

Col. 28, line 36, (Claim 8), change "witch" to --with--;

Signed and Sealed this

Twentieth Day of October, 1998

Attest:

BRUCE LEHMAN

Attesting Officer

Commissioner of Patents and Trademarks